United States Patent
Wood et al.

(10) Patent No.: US 9,544,632 B2
(45) Date of Patent: *Jan. 10, 2017

(54) METHODS AND APPARATUS TO CALCULATE VIDEO-ON-DEMAND AND DYNAMICALLY INSERTED ADVERTISEMENT VIEWING PROBABILITY

(71) Applicant: The Nielsen Company (US), LLC, New York, NY (US)

(72) Inventors: Benjamin Wood, Chicago, IL (US); John Charles Coughlin, Clearwater, FL (US); Molly Poppie, Arlington Heights, IL (US); Marie Kramer, Tarpon Springs, FL (US); Brian Fuhrer, Palm Harbor, FL (US); Albert T. Borawski, Oldsmar, FL (US); Joseph G. Milavsky, Dunedin, FL (US); Paul Donato, New York, NY (US); Balachander Shankar, Tampa, FL (US); David J. Kurzynski, South Elgin, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/044,939

(22) Filed: Feb. 16, 2016

(65) Prior Publication Data

US 2016/0165287 A1 Jun. 9, 2016

Related U.S. Application Data

(63) Continuation of application No. 14/618,658, filed on Feb. 10, 2015, now Pat. No. 9,277,265.

(Continued)

(51) Int. Cl.
*H04H 60/32* (2008.01)
*H04N 21/2668* (2011.01)
(Continued)

(52) U.S. Cl.
CPC .... *H04N 21/2668* (2013.01); *H04N 21/23424* (2013.01); *H04N 21/2407* (2013.01);
(Continued)

(58) Field of Classification Search
CPC .................................................. H04N 21/2668
(Continued)

(56) References Cited

U.S. PATENT DOCUMENTS 3,540,003 A 11/1970 Murphy
3,696,297 A 10/1972 Otero
(Continued)

FOREIGN PATENT DOCUMENTS

EP 0228242 7/1987
EP 0228458 7/1987
(Continued)

OTHER PUBLICATIONS

Screen Shot of ftp.ist.utl.pt, 1999, last modified Feb. 15, 2001 (3 pages).

(Continued)

*Primary Examiner* — Nasser Goodarzi
*Assistant Examiner* — Michael B Pierorazio
(74) *Attorney, Agent, or Firm* — Hanley, Flight & Zimmerman, LLC

(57) ABSTRACT

Methods, apparatus, systems and articles of manufacture are disclosed to calculate video-on-demand viewing probability. Example methods disclosed herein include identifying a first set of households associated with a target set of categories that presented a first media having a first telecast delay, calculating first total tuning minutes and first total exposure (Continued)

minutes for the first set of households, identifying a second set of households that presented the first media having the first telecast delay and having a portion of the target set of categories, the second set of households having second total tuning minutes and second total exposure minutes for each category in the second set of households, calculating a household tuning proportion based on the first and second total tuning minutes, and calculating a household exposure proportion based on the first and second total exposure minutes, and calculating the panelist viewing probability associated with the first telecast delay based on a ratio of the household exposure proportion and the household tuning proportion.

20 Claims, 12 Drawing Sheets

Related U.S. Application Data

(60) Provisional application No. 61/977,916, filed on Apr. 10, 2014, provisional application No. 61/940,994, filed on Feb. 18, 2014, provisional application No. 61/938,617, filed on Feb. 11, 2014.

(51) Int. Cl.
   H04N 21/24 (2011.01)
   H04N 21/258 (2011.01)
   H04N 21/81 (2011.01)
   H04N 21/234 (2011.01)
   H04N 21/25 (2011.01)
   H04N 21/442 (2011.01)
   H04N 21/466 (2011.01)

(52) U.S. Cl.
   CPC ......... *H04N 21/251* (2013.01); *H04N 21/252* (2013.01); *H04N 21/25883* (2013.01); *H04N 21/44222* (2013.01); *H04N 21/4663* (2013.01); *H04N 21/4667* (2013.01); *H04N 21/812* (2013.01)

(58) Field of Classification Search
   USPC .......................................................... 725/14
   See application file for complete search history.

(56) References Cited

U.S. PATENT DOCUMENTS

| | | |
|---|---|---|
| 3,818,458 A | 6/1974 | Deese |
| 3,906,454 A | 9/1975 | Martin |
| 4,058,829 A | 11/1977 | Thompson |
| 4,125,892 A | 11/1978 | Fukuda et al. |
| 4,166,290 A | 8/1979 | Furtman et al. |
| 4,236,209 A | 11/1980 | Lombardo, Jr. et al. |
| 4,258,386 A | 3/1981 | Cheung |
| 4,283,709 A | 8/1981 | Lucero et al. |
| 4,355,372 A | 10/1982 | Johnson et al. |
| 4,356,545 A | 10/1982 | West |
| 4,473,824 A | 9/1984 | Claytor |
| 4,516,216 A | 5/1985 | Armstrong |
| 4,546,382 A | 10/1985 | McKenna et al. |
| 4,566,030 A | 1/1986 | Nickerson et al. |
| 4,602,279 A | 7/1986 | Freeman |
| 4,603,232 A | 7/1986 | Kurland et al. |
| 4,658,290 A | 4/1987 | McKenna et al. |
| 4,677,552 A | 6/1987 | Sibley, Jr. |
| 4,695,880 A | 9/1987 | Johnson et al. |
| 4,700,378 A | 10/1987 | Brown |
| 4,706,121 A | 11/1987 | Young |
| 4,713,791 A | 12/1987 | Saluski |
| 4,718,025 A | 1/1988 | Minor et al. |
| 4,725,886 A | 2/1988 | Galumbeck et al. |
| 4,740,912 A | 4/1988 | Whitaker |
| 4,745,549 A | 5/1988 | Hashimoto |
| 4,745,559 A | 5/1988 | Willis et al. |
| 4,751,578 A | 6/1988 | Reiter et al. |
| 4,757,456 A | 7/1988 | Benghiat |
| 4,774,658 A | 9/1988 | Lewin |
| 4,783,648 A | 11/1988 | Homma et al. |
| 4,792,921 A | 12/1988 | Corwin |
| 4,817,080 A | 3/1989 | Soha |
| 4,823,290 A | 4/1989 | Fasack et al. |
| 4,831,582 A | 5/1989 | Miller et al. |
| 4,845,658 A | 7/1989 | Gifford |
| 4,849,879 A | 7/1989 | Chinnaswamy et al. |
| 4,868,866 A | 9/1989 | Williams, Jr. |
| 4,887,308 A | 12/1989 | Dutton |
| 4,907,188 A | 3/1990 | Suzuki et al. |
| 4,912,466 A | 3/1990 | Call |
| 4,912,522 A | 3/1990 | Oates et al. |
| 4,924,488 A | 5/1990 | Kosich |
| 4,930,011 A | 5/1990 | Kiewit |
| 4,935,870 A | 6/1990 | Burk, Jr. et al. |
| 4,954,699 A | 9/1990 | Coffey et al. |
| 4,958,284 A | 9/1990 | Bishop et al. |
| 4,961,132 A | 10/1990 | Uehara |
| 4,972,367 A | 11/1990 | Burke |
| 4,972,504 A | 11/1990 | Daniel, Jr. et al. |
| 4,977,455 A | 12/1990 | Young |
| 4,977,594 A | 12/1990 | Shear |
| 4,989,230 A | 1/1991 | Gillig et al. |
| 5,006,978 A | 4/1991 | Neches |
| 5,007,017 A | 4/1991 | Kobayashi |
| 5,008,929 A | 4/1991 | Olsen et al. |
| 5,019,963 A | 5/1991 | Alderson et al. |
| 5,023,907 A | 6/1991 | Johnson et al. |
| 5,023,929 A | 6/1991 | Call |
| 5,038,211 A | 8/1991 | Hallenbeck |
| 5,038,374 A | 8/1991 | Kaufman et al. |
| 5,042,027 A | 8/1991 | Takase et al. |
| 5,047,867 A | 9/1991 | Strubbe et al. |
| 5,049,873 A | 9/1991 | Robins et al. |
| 5,062,147 A | 10/1991 | Pickett et al. |
| 5,063,610 A | 11/1991 | Alwadish |
| 5,088,108 A | 2/1992 | Uddenfeldt et al. |
| 5,101,402 A | 3/1992 | Chiu et al. |
| 5,109,350 A | 4/1992 | Henwood et al. |
| 5,140,419 A | 8/1992 | Galumbeck et al. |
| 5,150,116 A | 9/1992 | West |
| 5,150,414 A | 9/1992 | Ng |
| 5,155,591 A | 10/1992 | Wachob |
| 5,159,685 A | 10/1992 | Kung |
| 5,161,109 A | 11/1992 | Keating et al. |
| 5,166,866 A | 11/1992 | Kim et al. |
| 5,181,113 A | 1/1993 | Chang |
| 5,204,947 A | 4/1993 | Bernstein et al. |
| 5,208,588 A | 5/1993 | Nishiyama |
| 5,210,530 A | 5/1993 | Kammerer et al. |
| 5,212,684 A | 5/1993 | MacNamee et al. |
| 5,214,792 A | 5/1993 | Alwadish |
| 5,220,522 A | 6/1993 | Wilson et al. |
| 5,220,655 A | 6/1993 | Tsutsui |
| 5,223,827 A | 6/1993 | Bell et al. |
| 5,223,924 A | 6/1993 | Strubbe |
| 5,226,120 A | 7/1993 | Brown et al. |
| 5,231,593 A | 7/1993 | Notess |
| 5,235,680 A | 8/1993 | Bijnagte |
| 5,237,677 A | 8/1993 | Hirosawa et al. |
| 5,237,681 A | 8/1993 | Kagan et al. |
| 5,237,684 A | 8/1993 | Record et al. |
| 5,239,540 A | 8/1993 | Rovira et al. |
| 5,241,625 A | 8/1993 | Epard et al. |
| 5,241,671 A | 8/1993 | Reed et al. |
| 5,245,429 A | 9/1993 | Virginio et al. |
| 5,247,517 A | 9/1993 | Ross et al. |
| 5,247,575 A | 9/1993 | Sprague et al. |
| 5,247,697 A | 9/1993 | Ban |
| 5,249,260 A | 9/1993 | Nigawara et al. |
| 5,251,324 A | 10/1993 | McMullan, Jr. |
| 5,253,346 A | 10/1993 | Okabayashi et al. |

(56) References Cited

U.S. PATENT DOCUMENTS

| | | |
|---|---|---|
| 5,260,878 A | 11/1993 | Luppy |
| 5,262,860 A | 11/1993 | Fitzpatrick et al. |
| 5,267,314 A | 11/1993 | Stambler |
| 5,267,351 A | 11/1993 | Reber et al. |
| 5,276,458 A | 1/1994 | Sawdon |
| 5,276,789 A | 1/1994 | Besaw et al. |
| 5,281,962 A | 1/1994 | Vanden Heuvel et al. |
| 5,283,639 A | 2/1994 | Esch et al. |
| 5,287,363 A | 2/1994 | Wolf et al. |
| 5,297,249 A | 3/1994 | Bernstein et al. |
| 5,299,115 A | 3/1994 | Fields et al. |
| 5,301,350 A | 4/1994 | Rogan et al. |
| 5,309,243 A | 5/1994 | Tsai |
| 5,315,093 A | 5/1994 | Stewart |
| 5,315,580 A | 5/1994 | Phaal |
| 5,317,140 A | 5/1994 | Dunthorn |
| 5,321,831 A | 6/1994 | Hirose |
| 5,321,838 A | 6/1994 | Hensley et al. |
| 5,327,237 A | 7/1994 | Gerdes et al. |
| 5,327,554 A | 7/1994 | Palazzi, III et al. |
| 5,331,544 A | 7/1994 | Lu et al. |
| 5,333,302 A | 7/1994 | Hensley et al. |
| 5,339,239 A | 8/1994 | Manabe et al. |
| 5,339,412 A | 8/1994 | Fueki |
| 5,347,632 A | 9/1994 | Filepp et al. |
| 5,349,662 A | 9/1994 | Johnson et al. |
| 5,351,278 A | 9/1994 | Koshishiba et al. |
| 5,351,293 A | 9/1994 | Michener et al. |
| 5,355,327 A | 10/1994 | Stent et al. |
| 5,355,484 A | 10/1994 | Record et al. |
| 5,359,367 A | 10/1994 | Stockill |
| 5,361,359 A | 11/1994 | Tajalli et al. |
| 5,367,677 A | 11/1994 | Stanfill |
| 5,371,846 A | 12/1994 | Bates |
| 5,374,951 A | 12/1994 | Welsh |
| 5,375,070 A | 12/1994 | Hershey et al. |
| 5,379,380 A | 1/1995 | Mori et al. |
| 5,382,970 A | 1/1995 | Kiefl |
| 5,388,211 A | 2/1995 | Hornbuckle |
| 5,388,252 A | 2/1995 | Dreste et al. |
| 5,388,258 A | 2/1995 | Larsson et al. |
| 5,390,281 A | 2/1995 | Luciw et al. |
| 5,398,336 A | 3/1995 | Tantry et al. |
| 5,406,569 A | 4/1995 | Isozaki |
| 5,408,607 A | 4/1995 | Nishikawa et al. |
| 5,410,598 A | 4/1995 | Shear |
| 5,412,778 A | 5/1995 | Andres |
| 5,414,809 A | 5/1995 | Hogan et al. |
| 5,418,728 A | 5/1995 | Yada |
| 5,461,708 A | 10/1995 | Kahn |
| 5,481,294 A | 1/1996 | Thomas et al. |
| 5,483,658 A | 1/1996 | Grube et al. |
| 5,485,897 A | 1/1996 | Matsumoto et al. |
| 5,491,820 A | 2/1996 | Belove et al. |
| 5,495,282 A | 2/1996 | Mostafa et al. |
| 5,495,581 A | 2/1996 | Tsai |
| 5,499,340 A | 3/1996 | Barritz |
| 5,524,073 A | 6/1996 | Stambler |
| 5,550,928 A | 8/1996 | Lu et al. |
| 5,555,303 A | 9/1996 | Stambler |
| 5,557,333 A | 9/1996 | Jungo et al. |
| 5,560,038 A | 9/1996 | Haddock |
| 5,568,471 A | 10/1996 | Hershey et al. |
| 5,572,643 A | 11/1996 | Judson |
| 5,594,911 A | 1/1997 | Cruz et al. |
| 5,594,934 A | 1/1997 | Lu et al. |
| 5,600,364 A | 2/1997 | Hendricks et al. |
| 5,604,867 A | 2/1997 | Harwood |
| 5,608,445 A | 3/1997 | Mischler |
| 5,615,264 A | 3/1997 | Kazmierczak et al. |
| 5,623,652 A | 4/1997 | Vora et al. |
| 5,634,100 A | 5/1997 | Capps |
| 5,646,998 A | 7/1997 | Stambler |
| 5,648,965 A | 7/1997 | Thadani et al. |
| 5,671,283 A | 9/1997 | Michener et al. |
| 5,673,382 A | 9/1997 | Cannon et al. |
| 5,696,702 A | 12/1997 | Skinner et al. |
| 5,706,502 A | 1/1998 | Foley et al. |
| 5,708,709 A | 1/1998 | Rose |
| 5,708,780 A | 1/1998 | Levergood et al. |
| 5,710,915 A | 1/1998 | McElhiney |
| 5,710,918 A | 1/1998 | Lagarde et al. |
| 5,712,979 A | 1/1998 | Graber et al. |
| 5,715,453 A | 2/1998 | Stewart |
| 5,717,860 A | 2/1998 | Graber et al. |
| 5,717,923 A | 2/1998 | Dedrick |
| 5,724,521 A | 3/1998 | Dedrick |
| 5,732,218 A | 3/1998 | Bland et al. |
| 5,737,619 A | 4/1998 | Judson |
| 5,740,549 A | 4/1998 | Reilly et al. |
| 5,781,893 A | 7/1998 | Felthauser et al. |
| 5,787,253 A | 7/1998 | McCreery et al. |
| 5,793,302 A | 8/1998 | Stambler |
| 5,796,952 A | 8/1998 | Davis et al. |
| 5,799,292 A | 8/1998 | Hekmatpour |
| 5,801,747 A | 9/1998 | Bedard |
| 5,819,156 A | 10/1998 | Belmont |
| 5,819,285 A | 10/1998 | Damico et al. |
| 5,823,879 A | 10/1998 | Goldberg et al. |
| 5,829,001 A | 10/1998 | Li et al. |
| 5,835,923 A | 11/1998 | Shibata et al. |
| 5,838,919 A | 11/1998 | Schwaller et al. |
| 5,841,433 A | 11/1998 | Chaney |
| 5,848,396 A | 12/1998 | Gerace |
| 5,857,190 A | 1/1999 | Brown |
| 5,870,546 A | 2/1999 | Kirsch |
| 5,872,588 A | 2/1999 | Aras et al. |
| 5,878,224 A | 3/1999 | Smith |
| 5,878,384 A | 3/1999 | Johnson et al. |
| 5,881,360 A | 3/1999 | Fong |
| 5,892,917 A | 4/1999 | Myerson |
| 5,926,168 A | 7/1999 | Fan |
| 5,931,912 A | 8/1999 | Wu et al. |
| 5,933,811 A | 8/1999 | Angles et al. |
| 5,935,207 A | 8/1999 | Logue et al. |
| 5,936,541 A | 8/1999 | Stambler |
| 5,948,061 A | 9/1999 | Merriman et al. |
| 5,951,643 A | 9/1999 | Shelton et al. |
| 5,956,483 A | 9/1999 | Grate et al. |
| 5,958,010 A | 9/1999 | Agarwal et al. |
| 5,963,914 A | 10/1999 | Skinner et al. |
| 5,964,839 A | 10/1999 | Johnson et al. |
| 5,974,148 A | 10/1999 | Stambler |
| 5,974,299 A | 10/1999 | Massetti |
| 5,977,964 A | 11/1999 | Williams et al. |
| 5,982,917 A | 11/1999 | Clarke et al. |
| 5,986,653 A | 11/1999 | Phathayakorn et al. |
| 5,991,735 A | 11/1999 | Gerace |
| 5,999,178 A | 12/1999 | Hwang et al. |
| 6,005,597 A | 12/1999 | Barrett et al. |
| 6,006,260 A | 12/1999 | Barrick, Jr. et al. |
| 6,014,638 A | 1/2000 | Burge et al. |
| 6,018,619 A | 1/2000 | Allard et al. |
| 6,049,695 A | 4/2000 | Cottam |
| 6,052,730 A | 4/2000 | Felciano et al. |
| 6,067,440 A | 5/2000 | Diefes |
| 6,070,145 A | 5/2000 | Pinsley et al. |
| 6,078,324 A | 6/2000 | Phathayakorn et al. |
| 6,108,637 A | 8/2000 | Blumenau |
| 6,112,238 A | 8/2000 | Boyd et al. |
| 6,112,240 A | 8/2000 | Pogue et al. |
| 6,115,608 A | 9/2000 | Duran et al. |
| 6,115,742 A | 9/2000 | Franklin et al. |
| 6,119,098 A | 9/2000 | Guyot et al. |
| 6,138,155 A | 10/2000 | Davis et al. |
| 6,167,358 A | 12/2000 | Othmer et al. |
| 6,173,311 B1 | 1/2001 | Hassett et al. |
| 6,185,586 B1 | 2/2001 | Judson |
| 6,216,129 B1 | 4/2001 | Eldering |
| 6,219,786 B1 | 4/2001 | Cunningham et al. |
| 6,226,677 B1 | 5/2001 | Slemmer |
| 6,237,033 B1 | 5/2001 | Doeberl et al. |
| 6,250,930 B1 | 6/2001 | Mintz |
| 6,256,739 B1 | 7/2001 | Skopp et al. |

(56) References Cited

U.S. PATENT DOCUMENTS

| | | |
|---|---|---|
| 6,264,560 B1 | 7/2001 | Goldberg et al. |
| 6,275,854 B1 | 8/2001 | Himmel et al. |
| 6,278,966 B1 | 8/2001 | Howard et al. |
| 6,279,036 B1 | 8/2001 | Himmel et al. |
| 6,279,112 B1 | 8/2001 | O'Toole, Jr. et al. |
| 6,286,036 B1 | 9/2001 | Rhoads |
| 6,298,348 B1 | 10/2001 | Eldering |
| 6,317,787 B1 | 11/2001 | Boyd et al. |
| 6,324,546 B1 | 11/2001 | Ka et al. |
| 6,360,261 B1 | 3/2002 | Boyd et al. |
| 6,381,632 B1 | 4/2002 | Lowell |
| 6,393,479 B1 | 5/2002 | Glommen et al. |
| 6,397,359 B1 | 5/2002 | Chandra et al. |
| 6,408,335 B1 | 6/2002 | Schwaller et al. |
| 6,418,470 B2 | 7/2002 | Blumenau |
| 6,434,532 B2 | 8/2002 | Goldband et al. |
| 6,446,261 B1 | 9/2002 | Rosser |
| 6,449,604 B1 | 9/2002 | Hansen et al. |
| 6,457,025 B2 | 9/2002 | Judson |
| 6,466,970 B1 | 10/2002 | Lee et al. |
| 6,473,407 B1 | 10/2002 | Ditmer et al. |
| 6,483,813 B1 | 11/2002 | Blencowe |
| 6,484,316 B1 | 11/2002 | Lindberg |
| 6,569,095 B2 | 5/2003 | Eggers |
| 6,601,100 B2 | 7/2003 | Lee et al. |
| 6,606,745 B2 | 8/2003 | Maggio |
| 6,609,239 B1 | 8/2003 | Xavier |
| 6,621,881 B2 | 9/2003 | Srinivasan |
| 6,625,648 B1 | 9/2003 | Schwaller et al. |
| 6,662,195 B1 | 12/2003 | Langseth et al. |
| 6,662,227 B2 | 12/2003 | Boyd et al. |
| 6,671,715 B1 | 12/2003 | Langseth et al. |
| 6,712,702 B2 | 3/2004 | Goldberg et al. |
| 6,719,660 B2 | 4/2004 | Palazzolo |
| 6,735,775 B1 | 5/2004 | Massetti |
| 6,766,370 B2 | 7/2004 | Glommen et al. |
| 6,807,558 B1 | 10/2004 | Hassett et al. |
| 6,842,782 B1 | 1/2005 | Malik et al. |
| 6,859,833 B2 | 2/2005 | Kirsch et al. |
| 6,993,590 B1 | 1/2006 | Gauthier et al. |
| 7,017,143 B1 | 3/2006 | Andrew et al. |
| 7,117,518 B1 * | 10/2006 | Takahashi ......... G06F 17/30867 |
| | | 348/E5.105 |
| 7,139,723 B2 | 11/2006 | Conkwright et al. |
| 7,146,329 B2 | 12/2006 | Conkwright et al. |
| 7,150,030 B1 | 12/2006 | Eldering et al. |
| 7,181,412 B1 | 2/2007 | Fulgoni et al. |
| 7,216,149 B1 | 5/2007 | Briscoe et al. |
| 7,222,071 B2 | 5/2007 | Neuhauser et al. |
| 7,260,823 B2 | 8/2007 | Schlack et al. |
| 7,260,837 B2 | 8/2007 | Abraham et al. |
| 7,343,616 B1 * | 3/2008 | Takahashi ............ H04H 60/65 |
| | | 348/E5.105 |
| 7,376,722 B1 | 5/2008 | Sim et al. |
| 7,451,151 B2 | 11/2008 | Horvitz et al. |
| 7,483,835 B2 | 1/2009 | Neuhauser et al. |
| 7,493,655 B2 | 2/2009 | Brown |
| 7,757,250 B1 | 7/2010 | Horvitz et al. |
| 7,827,227 B2 * | 11/2010 | Iijima ................ H04N 7/17309 |
| | | 709/201 |
| 7,953,791 B2 | 5/2011 | Or Sim et al. |
| 7,953,839 B2 | 5/2011 | Sim et al. |
| 7,962,935 B2 * | 6/2011 | Kurosaki .............. H04H 20/76 |
| | | 725/39 |
| 8,046,797 B2 | 10/2011 | Bentolila et al. |
| 8,112,511 B2 | 2/2012 | Sim et al. |
| 8,311,888 B2 | 11/2012 | Ramer et al. |
| 8,484,677 B1 | 7/2013 | Eldering et al. |
| 8,510,770 B1 * | 8/2013 | Oztaskent ............ H04L 67/22 |
| | | 705/319 |
| 8,531,606 B2 * | 9/2013 | Pyo ..................... H04H 20/12 |
| | | 348/570 |
| 8,898,689 B2 | 11/2014 | Georgakis |
| 8,984,547 B2 * | 3/2015 | Lambert ............... H04H 60/45 |
| | | 725/10 |
| 9,185,435 B2 | 11/2015 | Shankar et al. |
| 9,277,265 B2 | 3/2016 | Wood et al. |
| 2001/0049620 A1 | 12/2001 | Blasko |
| 2002/0040394 A1 | 4/2002 | Shapira |
| 2002/0040395 A1 | 4/2002 | Davis et al. |
| 2002/0049762 A1 | 4/2002 | Shah et al. |
| 2002/0056087 A1 * | 5/2002 | Berezowski ........... G06Q 30/02 |
| | | 725/9 |
| 2002/0072966 A1 | 6/2002 | Eldering et al. |
| 2002/0077787 A1 | 6/2002 | Rappaport et al. |
| 2002/0078191 A1 | 6/2002 | Lorenz |
| 2002/0099812 A1 | 7/2002 | Davis et al. |
| 2002/0099818 A1 | 7/2002 | Russell et al. |
| 2002/0099819 A1 | 7/2002 | Hattori et al. |
| 2002/0103664 A1 | 8/2002 | Olsson et al. |
| 2002/0112048 A1 | 8/2002 | Gruyer et al. |
| 2002/0124074 A1 | 9/2002 | Levy et al. |
| 2002/0150054 A1 | 10/2002 | Sohraby et al. |
| 2002/0161673 A1 | 10/2002 | Lee et al. |
| 2003/0018969 A1 | 1/2003 | Humpleman et al. |
| 2003/0046303 A1 | 3/2003 | Chen et al. |
| 2003/0046385 A1 | 3/2003 | Vincent |
| 2003/0062223 A1 | 4/2003 | Coyle et al. |
| 2003/0110485 A1 | 6/2003 | Lu et al. |
| 2003/0144868 A1 | 7/2003 | MacIntyre et al. |
| 2003/0145319 A1 * | 7/2003 | Sato ..................... H04H 60/31 |
| | | 725/14 |
| 2003/0149975 A1 | 8/2003 | Eldering et al. |
| 2003/0163563 A1 | 8/2003 | Bean |
| 2003/0182387 A1 | 9/2003 | Geshwind |
| 2003/0187677 A1 | 10/2003 | Malireddy et al. |
| 2003/0208578 A1 | 11/2003 | Taraborelli |
| 2003/0231203 A1 | 12/2003 | Gallella |
| 2004/0024717 A1 | 2/2004 | Sneeringer |
| 2004/0221033 A1 | 11/2004 | Davis et al. |
| 2005/114511 A1 | 5/2005 | Davis et al. |
| 2005/0149964 A1 * | 7/2005 | Thomas .............. G06Q 30/02 |
| | | 725/9 |
| 2006/0074769 A1 | 4/2006 | Looney et al. |
| 2006/0075421 A1 | 4/2006 | Roberts et al. |
| 2006/0136965 A1 * | 6/2006 | Ellis .................. H04H 60/31 |
| | | 725/46 |
| 2007/0011039 A1 | 1/2007 | Oddo |
| 2007/0022032 A1 | 1/2007 | Anderson et al. |
| 2007/0136753 A1 * | 6/2007 | Bovenschulte ........ H04H 60/31 |
| | | 725/46 |
| 2007/0143778 A1 * | 6/2007 | Covell .............. G06F 17/30743 |
| | | 725/19 |
| 2007/0174295 A1 | 7/2007 | Abraham et al. |
| 2007/0276940 A1 | 11/2007 | Abraham et al. |
| 2007/0294729 A1 * | 12/2007 | Ramaswamy ......... H04H 60/58 |
| | | 725/53 |
| 2007/0294740 A1 * | 12/2007 | Drake ................ H04N 7/17318 |
| | | 725/131 |
| 2008/0120650 A1 | 5/2008 | Orihara et al. |
| 2008/0140479 A1 | 6/2008 | Mello et al. |
| 2008/0256235 A1 | 10/2008 | Or Sim et al. |
| 2008/0263200 A1 | 10/2008 | Or Sim et al. |
| 2009/0055854 A1 | 2/2009 | Wright et al. |
| 2009/0112703 A1 | 4/2009 | Brown |
| 2009/0147786 A1 * | 6/2009 | Li ........................ H04L 12/185 |
| | | 370/390 |
| 2010/0205628 A1 * | 8/2010 | Davis ................... H04N 21/478 |
| | | 725/25 |
| 2010/0228855 A1 | 9/2010 | Sim et al. |
| 2011/0004682 A1 | 1/2011 | Honnold et al. |
| 2011/0029636 A1 * | 2/2011 | Smyth ................ G06F 17/3089 |
| | | 709/217 |
| 2011/0208860 A1 | 8/2011 | Sim et al. |
| 2011/0258049 A1 | 10/2011 | Ramer et al. |
| 2012/0124620 A1 * | 5/2012 | Nishizawa ......... H04N 21/4316 |
| | | 725/34 |
| 2012/0254911 A1 | 10/2012 | Doe |
| 2013/0163658 A1 | 6/2013 | Luff et al. |
| 2013/0179914 A1 | 7/2013 | Falcon |
| 2013/0227595 A1 | 8/2013 | Nielsen et al. |

(56) References Cited

U.S. PATENT DOCUMENTS

| | | | |
|---|---|---|---|
| 2014/0379421 A1 | 12/2014 | Shankar et al. | |
| 2014/0380348 A1 | 12/2014 | Shankar et al. | |
| 2014/0380350 A1* | 12/2014 | Shankar | G06Q 30/0204 725/18 |
| 2015/0189378 A1 | 7/2015 | Soundararajan et al. | |
| 2015/0229979 A1 | 8/2015 | Wood et al. | |

FOREIGN PATENT DOCUMENTS

| | | |
|---|---|---|
| EP | 0388658 | 9/1990 |
| EP | 0451384 | 10/1991 |
| EP | 0632382 | 1/1995 |
| EP | 0747841 | 12/1996 |
| JP | 2004357311 | 12/2004 |
| JP | 2008011365 | 1/2008 |
| KR | 20130008978 | 1/2013 |
| WO | 9826529 | 6/1998 |
| WO | 0111606 | 2/2001 |

OTHER PUBLICATIONS

Pestana et al., "A Visual History of Web Measurement: Vendor Emergence, Technology Deployment and Seminal Events," Jan. 1, 2005 (1 page).
"Third International World-Wide Web Conference—Technology, Tools and Applications," Apr. 10-14, 1995, retrieved from <http://www.igd.fhg.de/archive/1995_www95/>, retrieved on May 24, 2006 (1 page).
Sanders, "Plexus Log File Summaries," email message from sanders@bsdi.com, Jun. 18, 1993, retrieved from <http://ksi.cpsc.ucalgary.ca/archives/WWW-TALK/www-talk-1993q2.messages/563.html> retrieved from May 24, 2006 (4 pages).
"2.4—Windows Based Only Internet BBS Software—The Official BBS FAQ," retrieved from <http://www.sysopworld.com/bbsfaq/ch02.2.4.htm>, retrieved on May 24, 2006 (23 pages).
Java@mt.e-technik.uni-kassel.de, "Counter," retrieved from <http://web.archive.org/web/19970802020140/www.uni-kassel.de/fb16/ipm/mt/java/counteru.html>, retrieved on May 24, 2006 (1 page).
Wendt, "Applet Collection," retrieved from http://www.thew.de/t/collection/readme.html, retrieved on May 4, 2016 (5 pages).
Arbitron Inc., "Respondent-Level Data: Your Key to Reaching the Hispanic Listener," retrieved from <http://arbitronratings.com/ad_agencies/rld_vs_hispsumm.htm?inframe>, retrieved on Sep. 21, 2007 (1 page).
Abrams et al., "Multimedia Traffic Analysis Using CHITRA95," ACM Multimedia 95—Electronic Proceedings, Nov. 5-9, 1995, retrieved from <http://ei.cs.vt.edu/~succeed/95multimediaAWAFPR/95multimediaAWAFPR.html>, retrieved on Jun. 9, 2006 (17 pages).
Abrams, "A Tool to Aid in Model Development and Validation," NCR Corporation, Annual Simulation Symposium, Mar. 12-14, 1986 (10 pages).
Anderson et al., "Next Generation Intrusion Detection Expert System (NIDES)—Software Users Manual Beta—Update Release," SRI International, Dec. 1, 1994 (316 pages).
Barber, e-mail dated May 3, 1996 (2 pages).
Baskaran, "Gamelan Who's Who More Info," Earth Web, Inc., May 14, 1996 (2 pages).
Bates, "The Design of Browsing and Berrypicking Techniques for the Online Search Interface," Graduate School of Library and Information Science, University of California at Los Angeles, 1989, retrieved from <file://P:\ DriveFiles\CLIENTS\Nielsen-NetRatings\Settled Cases\Sane Solutions LLC\>, retrieved on Dec. 21, 2006 (19 pages).
Berners-Lee et al., "Uniform Resource Locators (URL)," Network Working Group, Dec. 1, 1994 (23 pages).

Berners-Lee, "Presentation of WWW to Online Publishing 93—World-Wide Web," retrieved from <http://www.w3org/Talks/OnlinePublishing93/Overview.html>, retrieved on May 24, 2006 (1 pages).
Berners-Lee et al., "Hypertext Transfer Protocol—HTTP/1.0," Network Working Group, May 1996, retrieved from <http://www.3.org/Protocols/rfc1945/rfc1945>, retrieved on Mar. 22, 2007 (57 pages).
Berners-Lee, "The World Wide Web Browser," retrieved from <http://www.w3.org/People/Berners-Lee/WorldWideWeb.html>, retrieved on May 24, 2006 (4 pages).
Bernstein et al., "Architectures for Volatile Hypertext," Hypertext '91 Proceedings, Dec. 15-18, 1991 (18 pages).
Bestavros et al., "Application-Level Document Caching in the Internet," Proceeding of the Second International Workshop on Services in Distributed and Networked Environments (SDNE '95), Jun. 5-6, 1995 (8 pages).
Bieber et al., "Backtracking in a Multiple-window Hypertext Environment," ECHT '94 Proceedings, Sep. 19-23, 1994 (9 pages).
Berners-Lee, "Plenary Talk at WWW Geneva 94," retrieved from <http://www.w3.org/Talks/WWW94Tim/>, retrieved on May 24, 2006 (4 pages).
Bl et al., "W3 Project—Assorted Design Notes—Working Notes," W3.org, retrieved from <http://www.w3.org/History/1994/WWW/WorkingNotes/Overview.html>, retrieved on May 24, 2006 (2 pages).
Blackarrow, Inc., "Meeting the Challenges of Video Advertising in an IP ABR Environment," 2012 (10 pages).
Blythe et al., "Lynx Users Guide Version 2.3," retrieved from <http://www.cse.unsw.edu.au/help/doc/lynx/lynx_help/Lynx_users_guide.html>, retrieved on Jun. 12, 2006 (12 pages).
Boyns, "Crazy Counter (GIF89a Version)," modified Mar. 8, 1996 (2 pages).
Boyns, "Crazy Counter (GIF89a)," modified Mar. 8, 1996 (1 page).
Boyns, "CrazyCounter.java," San Diego State University, Jan. 1996 (5 pages).
Braun et al., "Applied Network Research: 1994 Annual Status Report," Applied Network Research, San Diego Supercomputer Center and University of California, San Diego, Apr. 19, 1995 (15 pages).
Brueggeman, "Monitoring CDROM Usage," UCSD Scripps Institution of Oceanography Library, Nov. 1989, retrieved from <http://www.peterbrueggeman.com/cv/usage.txt>, retrieved on Oct. 1, 2015 (5 pages).
Carmel et al., "Browsing in Hypertext: A Cognitive Study," IEEE Transactions on Systems, Man, and Cybernetics, vol. 22, No. 5, Sep./Oct. 1992 (23 pages).
Chankhunthod et al., "A Hierarchical Internet Object Cache," ATEC '96 Proceedings of the 1996 Annual Conference on USENIX Annual Technical Conference, Jan. 22, 1996 (11 pages).
Chen, "Supporting Advertisement on Electronic Publications," IBM Technical Disclosure Bulletin, Aug. 1, 1996 (2 pages).
Claffy et al., "Traffic Characteristics of the T1 NSFNET Backbone," INFOCOM '93 Proceedings, Twelfth Annual Joint Conference of the IEEE Computer and Communications Societies, Networking: Foundation for the Future, IEEE, vol. 2, Mar./Apr. 1993 (11 pages).
Cove et al., "Online Text Retrieval Via Browsing," Information Processing and Management, vol. 24, No. 1, Jan. 1, 1988 (10 pages).
Cunha et al., "Characteristics of WWW Client-Based Traces," Computer Science Department, Boston University, Jul. 18, 1995 (19 pages).
Davis et al., "Instant Java Applets," Macmillan Computer Publishing USA, 1996 (234 pages).
Dellecave, Jr., "The Net Effect," Sales & Marketing Management: An Excutive's Guide to Sales and Marketing Technology, Mar. 1996 (9 pages).
Desjardins, "Activity Monitor 1.1 User's Guide," 1994 (5 pages).
Digital Envoy, "NetAcuity IP Intelligence Whitepaper," Digital Envoy, Inc., 2002-2003 (10 pages).
Earth Station 9, "Computers and the Internet," <http://www.earthstation9.com/counters.htm>, retrieved from May 24, 2006 (2 pages).

(56) References Cited

OTHER PUBLICATIONS

Earthweb, Inc., "Java-Enhanced Communication Tools," Gamelan, The Official Directory for Java, 1996 (7 pages).
Engagement Marketing Group, "Advanced Advertising Media Project—Phase One: Summary Report—Remaking Video-on-Demand to Deliver Media Value," May 11, 2011 (50 pages).
European Patent Office, "Supplementary Partial Search Report," issued in connection with European Patent Application No. 00949006.1, mailed Apr. 19, 2006 (4 pages).
European Patent Office, "Supplementary Search Report," issued in connection with European Patent Application No. 00949006.1, mailed Jul. 12, 2006 (5 pages).
European Patent Office, "Extended Search Report," issued in connection with European Patent Application No. 10012280.3, mailed Mar. 17, 2014 (6 pages).
European Patent Office, "Communication Pursuant to Article 94(3) EPC," issued in connection with European Patent Application No. 00949006.1, mailed Oct. 7, 2014 (6 pages).
Feliciano et al., "Lamprey: Tracking Users on the World Wide Web," Proceedings: a Conference of the American Medical Informatics Association, AMIA, Feb. 1996 (5 pages).
Fielding, "wwwstat manual," retrieved from <http://ftp.ics.uci.edu/pub/websoft/wwwstat/wwwstat.html>, retrieved on Jun. 12, 2006 (11 pages).
Finke, "Monitoring Usage of Workstations with a Relational Database," 1994 LISA—San Diego, California, Sep. 19-23, 1994 (10 pages).
Fleishman, "Web Log Analysis: Who's Doing What, When? Part 2," retrieved from <http://www.webdeveloper.com/management/management_log_analysis_2.html>, retrieved on Dec. 21, 2006 (4 pages).
Fuller, "Measuring User Motivation From Server Log Files," Usability Research, retrieved from <http://www.microsoft.com/usability/webconf/fuller/fuller.htm>, Oct. 30, 2000 (15 pages).
Gellman, "They Could be Monitoring Your Every Web Move," GCN, Apr. 29, 1996, retrieved from <http:www.gcn.com/print/15 9/31672-1.html>, retrieved on Apr. 20, 2006 (3 pages).
Girdley et al., "Web Programming with Java," 1996 (9 pages).
Gile, "Reporting Application Usage in a LAN Environment," ACM SIGUCCS, vol. 18, Sep./Oct. 1990 (13 pages).
Gilula et al., "A Direct Approach to Data Fusion," Journal of Marketing Research, vol. 43, Feb. 2006 (22 pages).
GoldMail, "GoldMail Thinks Consumers Should Get Paid for Reading Advertising!" Google Groups, Jul. 7, 1996 (4 pages).
GoldMail, "GoldMail Revolutionizes Internet Advertising!" Google Groups, Jul. 7, 1996 (4 pages).
Glassman, "A Caching Relay for the World Wide Web," Computer Networks and ISDN Systems, vol. 27, Issue 2, Nov. 1994 (10 pages).
Google Groups, "java project" "I am volunteering my time," retrieved from <http://groups.google.com/group/comp.lang.java.programmer/browse_thread/thread/5430a3...>, retrieved on Apr. 12, 2006 (3 pages).
Google Groups, "Counter," retrieved from <http://groups-beta.google.com/group/comp.lang.javascript/browse_thread/thread/4874a9f9c...>, retrieved on Jun. 8, 2005 (4 pages).
Google Groups, "Can U Make a Hit Counter in a Java Applet?," retrieved from <http://groups.google.com/group/comp.lang.java/browse_thread/thread/f2a41d0cb5c8eee4/c8...>, retrieved on May 2, 2006 (10 pages).
Google Groups, "xferstats," retrieved from <http://groups.google.com/group/comp.unix.xenix/browse_thread/thread/cb3d1aed21bc0e3e/8d9ce54693af9e98?q=xferstats&mum=200...>, retrieved on May 24, 2006 (3 pages).
Google Groups, "hit counter" retrieved from <http://groups.google.com/group/comp.infosystems.www.authoring.html/browse_thread/e515dad2e5d1e8cc/0ebdc329e9ec00cc?q=hit+c...> retrieved on May 24, 2006 (7 pages).

Google Groups, "Garrett Casey counter," Jul. 2, 1996, retrieved from <Google Groups: comp.infosystems.www.misc.entrepreneurs>, 2007 (3 pages).
Greenberg, "Using Unix: Collected Traces of 168 Users," Advanced Technologies, The Alberta Research Council, 1988 (14 pages).
Hansen et al., "Automated System Monitoring and Notification With Swatch," Seventh System Administration Conference (LISA '93), Monterey California, Nov. 1993 (9 pages).
Haran, "PC-Meter Tracks Computer Users," Advertising Age, Oct. 2, 1995, retrieved from <http://adage.com/print/85520>, retrieved on Jun. 2, 2015 (2 pages).
Highbeam Research, "Harris Computer Systems and Webster Network Strategies Announce Alliance to Offer WWW Monitoring Capabilities Through Firewalls," Business Wire, Mar. 4, 1996, retrieved from <http://www.highbeam.com> (5 pages).
Hilbert et al., "Agents for Collecting Application Usage Data Over the Internet," Department of Information and Computer Science, University of California, Irvine, retrieved from <http://www.ics.uci.edu/~redmiles/publications/C027-HR98.pdf>, retrieved on Oct. 1, 2015 (8 pages).
"Horace's Java—Page View Timer Demo—Form 1," Aug. 7, 1999 (2 pages).
Horak, "IOMON—Protected Mode I/O Port Monitor," Technical University of Prague, Faculty of Nuclear Science and Physical Engineering, Jan. 1992 (6 pages).
International Searching Authority, "International Search Report,"issued in connection with International Patent Application No. PCT/US2015/015219, mailed May 22, 2015 (4 pages).
International Searching Authority, "Written Opinion," issued in connection with International Patent Application No. PCT/US2015/015219, mailed May 22, 2015 (7 pages).
Ivler, "Advertising Models and Associated Software...," Google Groups, May 15, 1996 (5 pages).
Johnson et al., "Automatic Touring in a Hypertext System," IEEE Twelfth Annual International Phoenix Conference on Computers and Communications, Mar. 23-26, 1993 (7 pages).
Kamba et al., "The Krakatoa Chronicle—An Interactive, Personalized, Newspaper on the Web," Georgia Institute of Technology, 1995, retrieved from https://smartech.gatech.edu/handle/1853/3572 (15 pages).
Kugel et al., "Decay Effects in Online Advertising: Quantifying the Impact of Time Since Last Exposure," Presented at the ARF 50th Annual Convention, New York City, Apr. 26-28, 2004 (19 pages).
Lee et al., "Intelligent Agents for Matching Information Providers and Consumers on the World-Wide-Web," Proceedings of the Thirtieth Annual Hawaii International Conference on System Sciences, IEEE, vol. 4, Jan. 7-10, 1997 (11 pages).
Lubow, "An Engineer's Guide to Autocad," Industrial Engineering, vol. 19, No. 8, Aug. 1987 (6 pages).
Long, "Gwstat v1.1—Generate Graphs of HTTPD Server Traffic," BUBL Administrator, Jul. 14, 1994, retrieved from <http://www.bubl.ac.uk///archive/internet/www/servers/gswtat6.htm>, retrieved on Jun. 12, 2006 (1 page).
Marchionini, "Information-Seeking Strategies of Novices Using a Full-Text Electronic Encyclopedia," Journal of the American Society for Information Science, vol. 40, Issue 1, Jan. 1989 (16 pages).
McCanne et al., "The BSD Packet Filter: A New Architecture for User-level Packet Capture," Lawrence Berkeley Laboratory, Berkeley, California, Dec. 19, 1992 (11 pages).
McGee, "Web Pages: A Programmer's Perspective," Jun. 10, 1996, retrieved from <http://www.dfpug/loseblattsammlung/migration/whitepapers/webpages.htm>, retrieved on Mar. 22, 2007 (13 pages).
McGrath, "The Tail-Less Mouse," Computer Graphics World, vol. 11, Oct. 1988 (5 pages).
McKenzie et al., "An Empirical Analysis of Web Page Revisitation," Proceedings of the 34th Annual Hawaii International Conference on System Sciences, Jan. 6, 2001 (7 pages).
Mogul, "Efficient Use of Workstations for Passive Monitoring of Local Area Networks," WRL Research Report 90/5, Western Research Laboratory, Jul. 1990 (29 pages).

(56) References Cited

OTHER PUBLICATIONS

Mosaic Communications Corporation, "Welcome to Netscape," retrieved from <http://www.hnehosting.com/mirrors/Origin_of_a_Browser/mcom.10.1994/home/welcome.html>, retrieved on May 24, 2006 (2 pages).

Mueller, "InfoTicker Java Applet," Google Groups, May 11, 1996, retrieved from <http://groups.google.com/group/comp.infosystems.www.announce/browse_thread/thread/cc...>, retrieved on May 2, 2006 (2 pages).

NCSA, "In the Beginning There was NCSA Mosaic . . . " NCSA, retrieved from <http://www.ncsa.uiuc.edu/News/MosaicHistory/>, retrieved on Jun. 12, 2006 (15 pages).

Netscape, "Mosaic Communications Changes Name to "Netscape Communications Corporation,"" Netscape Communications Corporation, retrieved from <http://www.holgermetzger.de/netscape/NetscapeCommunicationsNewsRelease.htm>, retrieved on May 24, 2006 (2 pages).

Neumann, "Forum on Risks to the Public in Computers and Related Systems," Risks-Forum Digest, vol. 17, Issue 83, Mar. 4, 1996 (11 pages).

Ousterhout et al., "A Trace-Driven Analysis of the UNIX 4.2 BSD File System," Computer Science Division, Electrical Engineering and Computer Sciences, University of California, Apr. 25, 1985 (30 pages).

Pallap, "Marketing on the Internet," Journal of Consumer Marketing, vol. 13, No. 4, Aug. 1996 (17 pages).

Perlman, "Asynchronous Design/Evaluation Methods for Hypertext Technology Development," Hypertext '89 Proceedings, Nov. 1989 (21 pages).

Pew, "Instant Java," Sun Microsystems, Inc., 1996 (370 pages).

Philip Morris, "Teenage Attitudes and Behavior Study—Methodology 2006" (9 pages).

Pitkow et al., "A Simple Yet Robust Caching Algorithm Based on Dynamic Access Patterns," Proceedings of the Second International WWW Conference, GVU Technical Report; VU-GIT-94-39, 1994, retrieved from https://smartech.gatech.edu/handle/1853/3605 (8 pages).

Pitkow et al., "Results From the First World-Wide Web User Survey," Journal of Computer Networks and ISDN Systems, vol. 27, Issue 2, Nov. 1994 (15 pages).

Pitkow et al., "Using the Web as a Survey Tool: Results From the Second WWW User Survey," Journal of Computer Networks and ISDN Systems, vol. 27, Issue 6, Apr. 1995 (12 pages).

Pitkow et al., "Results From the Third WWW User Survey," Graphics, Visualization, & Usability Center, Georgia Institute of Technology, 1995 (10 pages).

Poler, "Improving WWW Marketing Through User Information and Non-Intrusive Communication," Internet Profiles Corporation (I/PRO), (4 pages).

Progressive Networks, Inc., "RealServer Administration and Content Creation Guide Version 4.0," Progressive Networks, Inc., 1995-1997 (366 pages).

Progressive Networks, Inc., "RealAudio Server Administration and Content Creation Guide Version 3.0," Progressive Networks, Inc., 1995-1996 (292 pages).

Raggett, "HTML 3.2 Reference Specification," W3C, Jan. 14, 1997, retrieved from <http://www.w3.org/TR/REC-html32>, retrieved from Mar. 22, 2007 (49 pages).

Regents of the University of California, "Changes to wwwstat: httpd Logfile Analysis Package," 1994,1996, retrieved from <http://ftp.ics.uci.edu/pub/websoft/wwwstat/Changes>, retrieved on Jun. 12, 2006 (4 pages).

Resonate, "Network Traffic Management, Database Traffic Management," Resonate, Inc. 2005 (2 pages).

Reuters, "Study Faults Online Ads for Kids, FTC Probes," Google Groups, Mar. 28, 1996 (3 pages).

Shepard, "TCP Packet Trace Analysis," MIT/LCS/TR-494, MIT Laboratory for Computer Science, Feb. 1991 (70 pages).

Stengle, "Tying TV Advertising to Action: Leveraging the Second Screen to Raise the Effectiveness & Measurability of TV Advertising," BlackArrow USA, 2012 (8 pages).

Sukaviriya et al., "A Second Generation User Interface Design Environment: The Model and the Runtime Architecture," GIT-GVU-92-24, Graphics, Visualization & Usability Center, Georgia Institute of Technology, Sep. 1992 (10 pages).

Sunsite, "Hot Java README and Link to the Software on SunSITE," SunSITE Software Information and Technology Exchange, retrieved from http://www.ibiblio.org/hotjava/>, retrieved on May 24, 2006 (1 page).

Symantec, "Using Norton pcANYWHERE for DOS," Symantec Corporation, 1994 (30 pages).

"tcpslice(8):—Linux Man Page," retrieved from <http://www.die.net/doc/linuxman/man8/tcpslice.8.html>, retrieved on Jun. 12, 2006 (3 pages).

Tapley et al., "The Official Gamelan Java Directory," EarthWeb, 1996 (6 pages).

"tcpslice—Linux Command—Unix Command," About, Inc., 2006, retrieved from <http://linux.about.com/library/cmd/blcmd18_tcpslice.htm>, retrieved on Jun. 12, 2006 (3 pages).

Thielman, "Comcast Pushes VOD Reruns into the C3 Window," Adweek, Dec. 2, 2013, retrieved from <http://www.adweek.com/news/television/comcast-pushes-vod-reruns-c3...>, retrieved on Feb. 10, 2014 (1 pages).

Tcpdump.org, "Tcpdump—dump traffic on a network," retrieved from <http://www.tcpdump.org/tcpdump_man.html>, retrieved on Jun. 12, 2006 (26 pages).

Tolle, "Performance Measurement and Evaluation of Online Information Systems," Proceedings of the 1985 ACM Computer Science Conference-Agenda for Computing Research: The Challenge for Creativity, Mar. 12-14, 1985 (8 pages).

"Tradewinds," Baker Library, Harvard Business School, vol. 2, No. 5, May 1995, retrieved from <http://members.verizon.net/~vze2vjb4/tw/tw2_5.txt>, retrieved on May 3, 2006 (11 pages).

User Society, "First International Conference on the World-Wide Web," May 1994, retrieved from <http://www.94.web.cern.ch/WWW94/>, retrieved on May 24, 2006 (2 pages).

W3.org, "CGI—Common Gateway Interface," W3C, Oct. 13, 1999, retrieved from <http://www.w3.org/CGI/>, retrieved on May 24, 2006 (2 pages).

Warren, "Audience Tracking System for Electronic Newspapers" Google Groups, May 3, 1995 (3 pages).

Weiler et al., "Usability Lab Tools: One Year Later," CHI'94, Conference Companion, 1994 (p. 330).

Wright, "Matt's Script Archive: Book'em Dano:Readme," 1996, retrieved from <file://P:\P Drive Files\CLIENTS\Nielsen-NetRatings\Settled Cases\Sane Solutions, LLC\>, retrieved on Dec. 21, 2006 (2 pages).

Wu et al., "Virtual Proxy Servers for WWW and Intelligent Agents on the Internet," Proceedings of the Thirtieth Annual Hawaii International Conference on System Sciences, vol. 4, Jan. 7-10, 1997 (10 pages).

Yahoo!, "Yahoo! Search Directory > Web Programming > Access Counters," retrieved from <http://dir.yahoo.com/Computers_and_Internet/Internet/World_Wide_Web/Programming/Access_Counters/>, retrieved on May 24, 2006 (3 pages).

Ziegler, "Startup Net Count Seeks to Tally How Many Web Surfers See Ads," The Wall Street Journal, Oct. 11, 1996 (2 pages).

Zillmer, "How to Make Your Web Ads Pay Off," Marketing Magazine, vol. 101, No. 23, Jun. 10, 1996 (4 pages).

United States Patent and Trademark Office, "Notice of Allowance," issued in connection with U.S. Appl. No. 14/313,390, mailed Jul. 7, 2015 (8 pages).

United States Patent and Trademark Office, "Non-Final Office Action," issued in connection with U.S. Appl. No. 14/313,390, mailed Jan. 22, 2015 (9 pages).

United States Patent and Trademark Office, "Notice of Allowance," issued in connection with U.S. Appl. No. 14/618,658, mailed Oct. 26, 2015 (9 pages).

European Patent Office, "Office Action," issued in connection with European Patent Application No. 00949006.1, mailed Apr. 18, 2008 (7 pages).

(56) References Cited

OTHER PUBLICATIONS

Google Groups, "wwwstat," retrieved from <http://groups.google.com/group/comp.infosystems.www/browse_thread/thread/784aa9c20470d342/fc0cde0742990875?q=wwwstat&mum=43...>, retrieved on May 24, 2006 (8 pages).
Google Groups, "fwgstat," retrieved from <http://groups.google.com/group/comp.infosystems.gopher/browse_thread/thread/15dc16c0284c02d0/953bf38f2cee15ea?q=fwgstat&mum=34...>, retrieved on May 24, 2006 (3 pages).
Google Groups, "fwgstat," retrieved from <http://groups.google.com/group/comp.infosystems.gopher/browse_thread/thread/4790232128a9157/d1534978ddddf998?q=fwgstat&mum=33...>, retrieved on May 24, 2006 (10 pages).
Google Groups, "getsites," retrieved from <http://groups.google.com/group/comp.infosystems.www/browse_thread/thread/a36eeb6daea735d8/0fa7adf53e51b894?q=getsites&mum=19 & h...>, retrieved on May 24, 2006 (2 pages).
Google Groups, "cgi hit counter," retrieved from <http://groups.google.com/group/comp.lang.perl/browse_thread/thread/b4ef428d8c96d525/3e18b779b1dad79e?q=cgi+hit+counter & mum=74 &...> retrieved on May 24, 2006 (7 pages).
Google Groups, "wusage 1.0," retrieved from <http://groups.google.com/group/comp.infosystems.www/browse_thread/thread/a07834d8b38dbc4f/f05bf1df25d47fd3?q=wusage+1.0&mum=1..>, retrieved on May 24, 2006 (2 pages).
Google Groups, "getstats," retrieved from <http://groups.google.com/group/comp.infosystems.www/browse_thread/thread/1009129de1aaf6aa/ed924b219923cc7d?q=getstats&mum=1 & h 1..>, retrieved on May 24, 2006 (3 pages).
Ibiblio, "Ibiblio—Ten Years in the Making—Aligning the Sites," retrieved from <http://www.ibiblio.org/history/>, retrieved on May 24, 2006 (10 pages).
Javapage, "JAVA," retrieved from <http://web.archive.org/web/20040712072256/http://www.groton.k12.ct.us/WWW/fsr/student/Spring02/W...>, retrieved on May 24, 2006 (4 pages).
Mobasher, "Introduction," retrieved from <http://maya.cs.depaul.edu/~mobasher/webminer/survey/node1.html>, Jul. 16, 1997 (2 pages).
Mobasher, "A Taxonomy of Web Mining," retrieved from <http://maya.cs.depaul.edu/~mobasher/webminer/survey/node2.html>, Jul. 16, 1997 (1 page).
Mobasher, "Content Mining," retrieved from <http://maya.cs.depaul.edu/~mobasher/webminer/survey/node3.html>, Jul. 16, 1997 (1 page).
Mobasher, "Agent-Based Approach," retrieved from <http://maya.cs.depaul.edu/~mobasher/webminer/survey/node4.html>, Jul. 16, 1997 (2 pages).
Mobasher, "DataBase Approach," retrieved from <http://maya.cs.depaul.edu/~mobasher/webminer/survey/node5.html>, Jul. 16, 1997 (2 pages).
Mobasher, "Web Usage Mining," retrieved from <http://maya.cs.depaul.edu/~mobasher/webminer/survey/node6.html>, Jul. 16, 1997 (2 pages).
Mobasher, "Pattern Discovery Tools," retrieved from <http://maya.cs.depaul.edu/~mobasher/webminer/survey/node7.html>, Jul. 16, 1997 (1 page).
Mobasher, "Pattern Analysis Tool," retrieved from <http://maya.cs.depaul.edu/~mobasher/webminer/survey/node8.html>, Jul. 16, 1997 (1 pages).
Mobasher, "Pattern Discovery from Web Transactions," retrieved from <http://maya.cs.depaul.edu/~mobasher/webminer/survey/node9.html>, Jul. 16, 1997 (1 page).
Mobasher, "Preprocessing Tasks," retrieved from <http://maya.cs.depaul.edu/~mobasher/webminer/survey/node10.html>, Jul. 16, 1997 (1 page).
Mobasher, "Data Cleaning," retrieved from <http://maya.cs.depaul.edu/~mobasher/webminer/survey/node11.html>, Jul. 16, 1997 (1 page).
Mobasher, "Transaction Identification," retrieved from <http://maya.cs.depaul.edu/~mobasher/webminer/survey/node12.html>, Jul. 16, 1997 (2 pages).
Mobasher, "Discovery Techniques on Web Transactions," retrieved from <http://maya.cs.depaul.edu/~mobasher/webminer/survey/node13.html>, Jul. 16, 1997 (1 page).
Mobasher, "Path Analysis," retrieved from <http://maya.cs.depaul.edu/~mobasher/webminer/survey/node14.html>, Jul. 16, 1997 (1 page).
Mobasher, "Association Rules," retrieved from <http://maya.cs.depaul.edu/~mobasher/webminer/survey/node15.html>, Jul. 16, 1997 (1 page).
Mobasher, "Sequential Patterns," retrieved from <http://maya.cs.depaul.edu/~mobasher/webminer/survey/node16.html>, Jul. 16, 1997 (1 page).
Mobasher, "Clustering and Classification," retrieved from <http://maya.cs.depaul.edu/~mobasher/webminer/survey/node17.html>, Jul. 16, 1997 (1 page).
Mobasher, "Analysis of Discovered Patterns," retrieved from <http://maya.cs.depaul.edu/~mobasher/webminer/survey/node18.html>, Jul. 16, 1997 (1 page).
Mobasher, "Visualization Techniques," retrieved from <http://maya.cs.depaul.edu/~mobasher/webminer/survey/node19.html>, Jul. 16, 1997 (1 page).
Mobasher, "OLAP Techniques," retrieved from <http://maya.cs.depaul.edu/~mobasher/webminer/survey/node20.html>, Jul. 16, 1997 (1 page).
Mobasher, "Data and Knowledge Querying," retrieved from <http://maya.cs.depaul.edu/~mobasher/webminer/survey/node21.html>, Jul. 16, 1997 (1 page).
Mobasher, "Usability Analysis," retrieved from <http://maya.cs.depaul.edu/~mobasher/webminer/survey/node22.html>, Jul. 16, 1997 (1 page).
Mobasher, "Web Usage Mining Architecture," retrieved from <http://maya.cs.depaul.edu/~mobasher/webminer/survey/node23.html>, Jul. 16, 1997 (3 pages).
Mobasher, "Research Directions," retrieved from <http://maya.cs.depaul.edu/~mobasher/webminer/survey/node24.html>, Jul. 16, 1997 (1 page).
Mobasher, "Data Pre-Processing for Mining," retrieved from <http://maya.cs.depaul.edu/~mobasher/webminer/survey/node25.html>, Jul. 16, 1997 (1 page).
Mobasher, "The Mining Process," retrieved from <http://maya.cs.depaul.edu/~mobasher/webminer/survey/node26.html>, Jul. 16, 1997 (1 page).
Mobasher, "Analysis of Mined Knowledge," retrieved from <http://maya.cs.depaul.edu/~mobasher/webminer/survey/node27.html>, Jul. 16, 1997 (1 page).
Mobasher, "Conclusion," retrieved from <http://maya.cs.depaul.edu/~mobasher/webminer/survey/node28.html>, Jul. 16, 1997 (1 page).
Mobasher, "References," retrieved from <http://maya.cs.depaul.edu/~mobasher/webminer/survey/node29.html>, Jul. 16, 1997 (6 pages).
Mobasher, "About This Document," retrieved from <http://maya.cs.depaul.edu/~mobasher/webminer/survey/node30.html>, Jul. 16, 1997 (1 page).
Muquit, "WWW Homepage Access Counter and Clock!" retrieved from <http://www.muquit.com/muquit/software/Count/Count.html>, retrieved on May 24, 2006 (32 pages).
Thomson, Jr., "Creation of the NSFnet," Commercialization of the Internet, 2000, retrieved from <http://johnthomson.org/j561/NSFcreate-4.html>, retrieved on May 24, 2006 (2 pages).
Thomson, Jr., "The Beginning of Commercialization of the NSFnet," Commercialization of the Internet, 2000, retrieved from <http://johnthomson.org/j561/NSFcomm-5.html>, retrieved on May 24, 2006 (1 page).
Thomson, Jr., "Criticism of the NSF Grows," Commercialization of the Internet, 2000, retrieved from <http://johnthomson.org/j561/NSFcriticism-6.html>, retrieved on May 24, 2006 (1 page).

(56) References Cited

OTHER PUBLICATIONS

Thomson, Jr., "The NSF Starts to Change Their Policy," Commercialization of the Internet, 2000, retrieved from <http://johnthomson.org/j561/NSFpolicy-7.html>, retrieved on May 24, 2006 (1 page).
Thomson Jr., Changes in NSF Policy Becomes Law—The Internet is Commercialized, Commercialization of the Internet, 2000, retrieved from <http://johnthomson.org/j561/NSFlaw-9.html>, retrieved on May 24, 2006 (1 page).
W3C, "HTTP: A Protocol for Network Information: Basic HTTP as Defined in 1992," retrieved from <http://www.w3.org/Protocols/HTTP/HTTP2.html>, retrieved on May 24, 2006 (2 pages).
"The World Wide Web Servers: W3 Servers," w3.org, retrieved from <http://www.w3.org/History/19921103-hypertext/hypertext/DataSources/WWW/Servers.html>, retrieved on May 24, 2006 (2 pages).
"The World Wide Web Project," w3.org, retrieved from <http://www.w3.org/History/19921103-hypertext/hypertext/WWW/TheProject.html>, retrieved on May 24, 2006 (1 page).
"Demonstrations—/JENC92," w3.org, retrieved from <http://www.w3.org/Conferences/JENC92/Demonstrations.html>, retrieved on May 24, 2006 (1 page).
BL, "An Updated Quick Look at Viola WWW," retrieved from <http://www.w3.org/History/19921103-hypertext/hypertext/Viola/Review.html>, retrieved on May 24, 2006 (2 pages).
W3C, "HyperText Transfer Protocol Design Issues," retrieved from <http://www.w3.org/Protocols/DesignIssues.html>, retrieved on May 24, 2006 (3 pages).
"WorldWideWeb for C5," Presentation, w3.org, May 17, 1991, retrieved from <http://www.w3.org/Talks/C5_17_May_91.html>, retrieved on May 24, 2006 (1 page).
W3C, "Change History for httpd," retrieved from <http://www.w3.org/Daemon/Features.html>, retrieved on May 24, 2006 (15 pages).
W3C, "A Little History of the Word Wide Web (1945-1995)," retrieved from <http://www.w3.org/History.html>, retrieved on May 24, 2006 (6 pages).
Wandschneider, "ActiveX Controls Framework: Sample Code for Authoring Non-MFC Controls," Microsoft Corporation, Apr. 1996, retrieved from <http://msdn.microsoft.com/archive/en-us/dnaractivex/html/msdn_ctrlfmk.asp?frame=true>, retrieved on Mar. 22, 2007 (15 pages).
Watt, "Management Tools Get with the Web," Network World, vol. 14, No. 25, Jun. 23, 1997 (1 page).
Weber, "New Software Helps Advertisers Get Through Tangled Web Pages," The Wall Street Journal, Oct. 23, 1996 (2 pages).
Websidestory and AIG, "On Demand Analytics Presentation," Jun. 22, 2005 (10 pages).
Weston, "Netscape 2.0b2 allows for invasion of privacy," TBTF, Dec. 2, 1995, retrieved from <http://www.tbtf.com/resource/b2-privacy-bug.html>, retrieved on May 24, 2006 (2 pages).
Wilson, "Browser Timelines (Releases Important to HTML and CSS Development = Index DOT Html/Css," retrieved from <http://www.blooberry.com/indexdot/history/browsers6.htm> retrieved on May 24, 2006 (3 pages).
Wilson, "Opera (Opera Software) Index DOT Html/Css," retrieved from <http://www.blooberry.com/indexdot/history/opera.htm> retrieved on May 24, 2006 (3 pages).
Zaiane et al., "Discovering Web Access Patterns and Trends by Applying OLAP and Data Mining Technology on Web Logs," IEEE International Forum on Research and Technology Advances in Digital Libraries, Apr. 1998 (12 pages).
McGrew, "Web Authoring FAQ," The Web Design Group, 2005, posted to comp.infosystems.www.authoring.html, retrieved from File://13:\P DriveFiles\CLIENTS\Nielsen-NetRatings\Settled Cases\Sane Solutions, LLC\ retrieved on Dec. 21, 2006 (59 pages).
wwwTalk 1991 Archives, "Messages from Monday Oct. 28, 1991 to Friday, Dec. 13, 1991," retrieved from <http://ksi.cpsc.ucalgary.ca/archives/WWW-talk/www-talk-1991.index.html>, retrieved on May 24, 2006 (1 page).

European Patent Office, "Communication Pursuant to Article 94(3) EPC ," issued in connection with European Patent Application No. 00949006.1, mailed Oct. 7, 2014 (6 pages).
Applets At Kassel, "Applets and Applications," Department of Engineering Measurement, Dec. 12, 1996, retrieved from <http://web.archive.org/web/19970802020436/http://www.uni-kassel.de/fb16/ipm/mt/java/javae.html>, retrieved on May 24, 2006 (5 pages).
Applet Demos, 1995-1996 (2 pages).
Arbitron Inc., "Smartplus 8.0: Keeps Getting Smarter So You Can Too," 2007, retrieved from <http://www.arbitron.com/ad_agencies/smartplus8.html>, retrieved on Sep. 21, 2007 (13 pages).
Arlitt et al., "Internet Web Servers: Workload Characterization and Performance Implications," IEEE/ACM Transactions on Networking, vol. 5, No. 5, Oct. 1997 (15 pages).
Bank, "Java Security," MIT, Dec. 8, 1995, retrieved from <http://groups.csail.mit.edu/mac/users/jbank/javapaper/javapaper.html,> retrieved on Apr. 30, 2015 (11 pages).
Becker, "Department of Engineering Measurement," UNI Kassel, Sep. 20, 1996 (1 page).
Beckett, "Combined Log System," Computing Laboratory, University of Kent, retrieved from <http://www.igd.fhg.de/archive/1995_www95/papers/46/comblog.html>, retrieved on May 24, 2006 (8 pages).
Berners-Lee, "WorldWideWeb: Proposal for a HyperText Project," Nov. 12, 1990 (7 pages).
Berners-Lee, "Information Management: A Proposal," CERN, Mar. 1989, May 1990, retrieved from <http://www.w3.org/History/1989/proposal.html>, retrieved on May 24, 2006 (14 pages).
Bertot et al., "Web Usage Statistics: Measurement Issues and Analytical Techniques," Government Information Quarterly, vol. 14, No. 4, 1997 (23 pages).
Boyan, "Anonymous Surfing, The Anonymizer Homepage," Anonymizer, Sep. 1, 1995, retrieved from <http://web.archive.org/web/19990208003332m_1/anonymizer.cs.cmu.edu:8080/>, retrieved on May 24, 2006 (1 page).
Catledge et al., "Characterizing Browsing Strategies in the World-Wide Web," Proceedings of the Third International World-Wide Web Conference on Technology, Tools and Applications, Apr. 1995 (9 pages).
CERN, "Computer News Letter Oct.-Dec. 1991," Ref. CERN-CNL-1991-204, vol. 26, Issue No. 3, retrieved from <http://ref.web.cern.ch/ref/CERN/CNL/1991/204/>, retrieved on May 24, 2006 (2 pages).
Cooley et al., "Data Preparation for Mining World Wide Web Browsing Patterns," Knowledge and Information Systems, vol. 1, 1999 (27 pages).
Cooley et al., "Web Mining: Information and Pattern Discovery on the World Wide Web," Department of Computer Science, University of Minnesota, Jul. 16, 1997 (2 pages).
Cooper, "Design Considerations in Instrumenting and Monitoring Web-Based Information Retrieval Systems," Journal of the American Society for Information Science, vol. 49, No. 10, 1998 (17 pages).
Crovella et al., "Self-Similarity in World Wide Web Traffic: Evidence and Possible Causes," IEEE/ACM Transactions on Networking, vol. 5, No. 6, Dec. 1997 (25 pages).
Crovella et al., "Explaining World Wide Web Traffic Self-Similarity," Computer Science Department, Boston University, Technical Report TR-95-015, Oct. 12, 1995 (19 pages).
Dean et al. (1995) "Security Flaws in the HotJava Web Browser," Department of Computer Science, Princeton University, Nov. 3, 1995 (8 pages).
December et al., "HTML and CGI Unleashed," Sams.net Publishing, 1995 (841 pages) (NPL in 5 parts).
E-mail Counter Logs, 1996 (33 pages).
Fielding, "wwwstat: HTTPd Logfile Analysis Software," Department of Information and Computer Science, University of California, Irvine, retrieved from <http://ftp.ics.uci.edu/pub/websoft/wwwstat/>, retrieved on May 24, 2006 (3 pages).
Girdley et al., "Web Programming with Java," Sams.net Publishing, 1996 (499 pages) (NPL in 2 parts).
Google Groups, "access counters," retrieved from <http://groups.google.com/group/comp.infosystems.www.authoring.html/

(56) References Cited

OTHER PUBLICATIONS browse_thread/thread/dfbla837f29e165e/ a0e0e6a131c6102d?q=access...> retrieved on May 24, 2006 (3 pages).
Google Groups, "javascript," retrieved from <http://groups.google.com/group/comp.society.privacy/browse_thread/thread/9b12496aeda7fd78/dd2ebe5f8966fd05?q=javascript&mum=1&hl>, retrieved on May 24, 2006 (3 pages).
Google Groups, "javascript counter script," retrieved from <http://groups.google.com/group/comp.databases.oracle/browse_thread/thread/97671e385d1bac94/777a82875e328555?q=javascript+counter+sc...>, retrieved on May 24, 2006 (2 pages).
Google Groups, "javascript exploit," retrieved from <http://groups.google.com/group/comp.sys.mac.misc/browse_thread/thread/f9285c7d4e4354cd/eb94d50669840159?q=javascript+exploit&mum>, retrieved on May 24, 2006 (3 pages).
Google Groups, "Garrett Casey," retrieved from <Google Groups: comp.infosystems.www.authoring.cgi>, 2007 (2 pages).
Google Groups, "xferstats," retrieved from <http://groups.google.com/group/alt.sources/browse_thread/thread/c9e60d434be3ad86/0a180tb213f27e2b?q=xferstats&mum=199&h1=en>, retrieved on May 24, 2006 (10 pages).
Google Groups, "cgi hit counter," retrieved from <http://groups.google.com/group/comp.infosystems.www.users/browse_thread/thread/390dc231bb3f0097/64bddc80086f124b?q=cgi+hit+counter> retrieved on May 24, 2006 (2 pages).
Gotta et al., "Performance Evaluation of Web Applications," Proceeding of the Computer Measurement Group International Conference, 1998 (13 pages).
Grobe, "An Early History of Lynx: Multidimensional Collaboration," Academic Computing Services, University of Kansas, Apr. 10, 1997, retrieved from <http://people.cc.ku.edu/~grobe/early-lynx.html>, retrieved on May 24, 2006 (8 pages).
Gundavaram, "CGI Programming on the World Wide Web," o'Reilly & Associates, Inc., 1996 (455 pages) (NPL in 2 parts).
Hallam-Baker et al., "Extended Log File Format," W3C, Working Draft WD-logfile-960323, retrieved from <http://www.w3.org/TR/WD-logfile.html>, retrieved on May 24, 2006 (6 pages).
Hello Net! Counter, filed Aug. 21, 2007 (1 page).
Holgermetzger, "A Netscape Timeline," Mar. 1993 through Mar. 17, 2006, retrieved from <http://www.holgermetzger.de/Netscape_History.html>, retrieved on May 24, 2006 (4 pages).
Houston, "A Vision of Advertising Technology—How It Will Work and Why Advertisers Must Involve Themselves in the Process," Modern Media, Aug. 1994, retrieved from <http://www.web.archive.org/web/19961111095749/www.modernmedia.com/clippings/articles/sm...>, retrieved on Jun. 8, 2005 (6 pages).
W3, "Logging Control in W3C httpd," w3.org, Jul. 1995, retrieved from <http://www.w3.org/Daemon/User/Config/Logging.html>, retrieved on May 24, 2006 (3 pages).
Intellectual Property Office of the United Kingdom, "Examination Report," issued in connection with United Kingdom Patent Application No. GB0920943.8, mailed Nov. 10, 2010 (6 pages).
Intellectual Property Office of the United Kingdom, "Examination Report," issued in connection with United Kingdom Patent Application No. GB0920943.8, mailed Apr. 11, 2011 (5 pages).
International Bureau, "International Preliminary Report on Patentability," issued in connection with International Patent Application No. PCT/US2008/059874, mailed Dec. 10, 2009 (7 pages).
International Searching Authority, "International Search Report," issued in connection with International Patent Application No. PCT/US2008/059874, mailed Mar. 2, 2009 (3 pages).
International Searching Authority, "Written Opinion," issued in connection with International Patent Application No. PCT/US2008/059874, mailed Mar. 2, 2009 (5 pages).

International Preliminary Examining Authority, "International Preliminary Examination Report," issued in connection with International Patent Application No. PCT/AU00/00937, issued Nov. 2, 2001 (3 pages).
IP Australia, "Examiner's First Report," issued in connection with Australian Patent Application No. 2008260397, mailed Nov. 17, 2010 (2 pages).
IP Australia, "Notice of Acceptance," issued in connection with Australian Patent Application No. 2008260397, mailed Aug. 7, 2012 (2 pages).
Japan Patent Office, "Notice of Reasons for Rejection," issued in connection with Japanese Patent Application No. 2001-516087, mailed May 18, 2010 (14 pages).
Japan Patent Office, "Notice of Reasons for Rejection," issued in connection with Japanese Patent Application No. 2001-516087, mailed Jan. 25, 2011 (8 pages).
Lamers, "WebThreads, LLC of Vienna, VA, USA is Pleased to Announce WebThreads™ 1.0.1 Website Interactivity and Visitor Tracking Solution," Oct. 8, 1996 (5 pages).
JavaWorld, JavaWorld: IDG's Magazine for the Java Community, vol. 1, Issue 1, retrieved from <www.javaworld.com>. Mar. 8, 1996 (1 page).
JavaWorld, JavaWorld: IDG's Magazine for the Java Community, vol. 1, Issue 2, retrieved from <www.javaworld.com>. Apr. 1, 1996 (1 page).
JavaWorld, JavaWorld Editorial Calendar, Feb. 26, 1996 (1 page).
Johnson, "Implementation Guide, HBX On-Demand Web Analytics," WebSideStory, Inc., 2006 (12 pages).
Kamba, "Personalized Online Newspaper," NEC, vol. 49, No. 7, 1996 (Abstract in English Only) (6 pages).
Kent et al., "Official Netscape JavaScript Book," 1996 (508 pages) (NPL in 2 parts).
Kiesler et al., "Homenet: A Field Trial of Residential Internet Services," Carnegie Mellon University, Apr. 1995, retrieved from <http://homenet.hcii.cs.cmu.edu/progress/report1.html> (12 pages).
Kraut et al., "Homenet: A Field Trial of Residential Internet Services," Carnegie Mellon University, Apr. 1995, retrieved from <http://www.acm.org/sigchi/chi96/proceedings/papers/Kraut/rek_txt.htm> (14 pages).
Levine, "Computer Privacy Digest V8#024" Computer Privacy Digest Sun, vol. 8, Issue No. 024, Mar. 17, 1996, retrieved from <http://web.archive.org/web/20000829051834/itu.rdg.ac.uk/misc/Mailing_Lists/cpd/00000002.htm>, retrieved on May 24, 2006 (19 pages).
Loverso, "Netscape Navigator 2.0 Exposes User's Browsing History," The Risks Digest, vol. 7, Issue 79, Feb. 23, 1996, retrieved from <http://catless.ncl.ac.uk/Risks/17.79.html>, retrieved on Dec. 11, 2005 (2 pages).
Lynnworth, "Tracking Home Page Hits," Dr. Dobbs Journal, Dec. 1, 1995, retrieved from <http://www.drdobbs.com/article/print?articleId=184409739&siteSectionName=web-development>, retrieved on Apr. 30, 2015 (7 pages).
Mayer-Schonberger, "The Internet and Privacy Legislation: Cookies for a Treat?" West Virginia University, retrieved from <http://web.archive.org/web/19990203034203/www.wvjolt.wvu.edu/wvjolt/current/issue1/articles/mayer/...>, retrieved on May 24, 2006 (7 pages).
Mcgraw et al., "Untangling the Woven Web: Testing Web-based Software," Reliable Software Technologies Corporation, Apr. 1, 1996 (9 pages).
Consoli, "Nielsen Unveils National TV/Internet Fusion," Mediaweek, Nov. 1, 2006, retrieved from <http://mediaweek.printthis.clickability.com/pt/cpt?action=cpt&title=...>, retrieved on Sep. 21, 2007 (2 pages).
Microsoft Corporation, "Screen Shots of Windows NT 3:1," retrieved from <http://www.cs.umd.edu/hcil/muiseum/systems/winnt31src.html>, retrieved on Jun. 7, 2005 (4 pages).
Montgomery, "Using Clickstream Data to Predict WWW Usage," Carnegie Mellon University, Aug. 1999 (27 pages).
Mulvenna et al., "The 'Soft-Push:' Mining Internet Data for Marketing Intelligence," ResearchGate, Sep. 24, 2014 (12 pages).

(56) References Cited

OTHER PUBLICATIONS

National Defense University, "Information Operations Timeline," retrieved from <http://www.jfsc.ndu.edu/schools_programs/jciws/iw/io_timeline.asp>, retrieved on May 24, 2006 (9 pages).

Naughton, "The JAVA Handbook," 1996 (446 pages) (NPL in 2 parts).

Net.genesis et al., "Build a Web Site: The Programmer's Guide to Creating, Building, and Maintaining Web Presence," 1995 (721 pages) (NPL in 3 parts).

Netscape Communication and Sun Microsystems, "Sun and Netscape Announce JavaScript," Dec. 4, 1995 (8 pages).

Nardone, "The Modem Media Internet Reach and Involvement Scale (IRIS)," Modem Media, Feb. 1995, retrieved from <http://web.archive.org/web/19961111095728/www.modemmedia.com/clippings/articles/iris>, retrieved on Jun. 8, 2005 (3 pages).

Naor et al., "Secure Accounting and Auditing on the Web," Computer Networks and ISDN Systems, vol. 30, 1998 (10 pages).

Nielsen, "Classic HTTP Documents," W3C, May 14, 1998, retrieved from <http://www.w3.org/Protocols/Classic.html>, retrieved on May 24, 2006 (1 page).

O'Connell, "A New Pitch: Advertising on the World Wide Web is a Whole New Ball Game," Modem Media, May 1995, retrieved from <http://web.archive.org/web/19961111095738/www.modernmedia.com/clippings/articles/ne...>, retrieved on Jun. 8, 2005 (8 pages).

Older Counter.html history, "Older History of Changes," 1995-1996, retrieved from <http://www.ualberta.ca/Geo/Counter.History.html>, retrieved on May 24, 2006, (8 pages).

Ostermann, "Tcptrace Homepage," retrieved from <http://www.tcptrace.org, retrieved on Jun. 12, 2006 (1 page).

Padmanabhan et al., "Analysis of Web Site Usage Data: How Much Can We Learn About the Consumer from Web Logfiles?," Center for Digital Economy Research, Stern School of Business, Working Paper Stern #IS-96-18, Dec. 1996 (33 pages).

Pierrakos et al., "Web Usage Mining as a Tool for Personalization: A Survey," User Modeling and User-Adapted Interaction, vol. 13, 2003 (62 pages).

Powell, "Tomorrow's Heavyweight?" Network World, vol. 15, No. 49, Dec. 7, 1998 (1 page).

Internet Profiles Corporation, "I/PRO is First to Develop a Solution for Measuring Java Applets," Apr. 12, 1996 (2 pages).

Realnetworks Inc., "Real System 5.0 Security Features Whitepaper," 1997 (10 pages).

Realnetworks Inc., "RealServer Administration Guide Version 5.0," 1995-1997 (262 pages).

Rodley, "Writing Java Applets," 1996 (438 pages) (NPL in 2 parts).

Schmittlein, "Why Does the NBD Model Work?" (Abstract), Marketing Science at the University of Florida, vol. 4, No. 3, Summer 1985, retrieved from <http://bear.cba.ufl.edu/centers/mks/abstracts/vol4/no3/schmittleinbe.> (1 page).

Seshan et al., "SPAND: Shared Passive Network Performance Discovery," Proceedings of the USENIX Symposium on Internet Technologies and Systems, Monterey, California, Dec. 1997 (13 pages).

Shahabi et al., "Knowledge Discovery from Users Web-Page Navigation," 1997 retrieved from <http://www.ict.griffith.edu.au/~vlad/teaching/kdd.d/readings.d/shahabi97knowledge.pdf> (11 pages).

Siochi et al., "Computer Analysis of User Interfaces Based on Repetition in Transcripts of User Sessions," ACM Transactions on Information Systems, vol. 9, No. 4, Oct. 1991 (27 pages).

Staten, "Navigator Tricks Raise Concerns (Privacy Concerns Raised by the Addition of JavaScript and HTTP Cookie to Netscape Communications' Navigator 3.0 Web Browser)," MacWeek, vol. 10, No. 11, Mar. 18, 1996 retrieved from <http://www.dialogclassic.com/main.vmgw>, retrieved on Jun. 7, 2005 (2 pages).

The Nielsen Company (US), LLC, "Complaint for Patent Infringement," Case 2:11-cv-00168-RGD-TEM, filed with the United States District Court for the Eastern District of Virginia Alexandra Division and transferred to the Norfolk Division on Mar. 15, 2011 (13 pages).

United States Patent and Trademark Office, "Final Office Action," issued in connection with U.S. Appl. No. 12/100,685, mailed Nov. 16, 2009 (9 pages).

United States Patent and Trademark Office, "Non-Final Office Action," issued in connection with U.S. Appl. No. 12/100,685, mailed Feb. 12, 2009 (15 pages).

United States Patent and Trademark Office, "Final Office Action," issued in connection with U.S. Appl. No. 09/763,338, mailed Jul. 12, 2007 (20 pages).

United States Patent and Trademark Office, "Non-Final Office Action," issued in connection with U.S. Appl. No. 12/100,698, mailed Jan. 20, 2010 (18 pages).

United States Patent and Trademark Office, "Non-Final Office Action," issued in connection with U.S. Appl. No. 12/100,698, mailed Sep. 25, 2009 (17 pages).

United States Patent and Trademark Office, "Non-Final Office Action," issued in connection with U.S. Appl. No. 12/780,890, mailed Oct. 1, 2010 (9 pages).

United States Patent and Trademark Office, "Non-Final Office Action," issued in connection with U.S. Appl. No. 13/098,358, mailed Jul. 27, 2011 (10 pages).

United States Patent and Trademark Office, "Non-Final Office Action," issued in connection with U.S. Appl. No. 09/763,338, mailed Nov. 21, 2006 (18 pages).

United States Patent and Trademark Office, "Notice of Allowance," issued in connection with U.S. Appl. No. 12/100,698, mailed Feb. 25, 2011 (12 pages).

United States Patent and Trademark Office, "Notice of Allowance," issued in connection with U.S. Appl. No. 12/100,698, mailed Oct. 20, 2010 (11 pages).

United States Patent and Trademark Office, "Notice of Allowance," issued in connection with U.S. Appl. No. 12/780,890, mailed Mar. 22, 2011 (12 pages).

United States Patent and Trademark Office, "Notice of Allowance," issued in connection with U.S. Appl. No. 13/098,358, mailed Dec. 13, 2011 (12 pages).

United States Patent and Trademark Office, "Notice of Allowance," issued in connection with U.S. Appl. No. 09/763,338, mailed Jan. 2, 2008 (7 pages).

United States Patent and Trademark Office, "Requirement for Restriction/Election," issued in connection with U.S. Appl. No. 09/763,338, mailed Aug. 1, 2006 (6 pages).

Google Groups, "fwgstat," retrieved from <http://groups.google.com/group/comp.infosystems.gopher/browse_thread/thread/15dc16c0284c02d0/953bf38f2ceel5ea?q=fwgstat&mum=34...>, retrieved on May 24, 2006 (3 pages).

Google Groups, "getsites," retrieved from <http://groups.google.com/group/comp.infosystems.www/browse_thread/threada36eeb6daea735d8/0fa7adf53e51b894?q=getsites&mum=19 & h...>, retrieved on May 24, 2006 (2 pages).

Google Groups, "cgi hit counter," retrieved from <http://groups.google.com/group/complang.perl/browse_thread/thread/b4ef428d8c96d525/3e18b779b1dad79e?q=cgi+hit+counter & mum=74 &...> retrieved on May 24, 2006 (7 pages).

Google Groups, "wusage 1.0," retrieved from <http://groups.google.com/group/comp.infosystems.www/browse_thread/thread/a07834d8b38dbc4f/f05bfldf25d47fd3?q=wusage+1.0&mum=1..>, retrieved on May 24, 2006 (2 pages).

Google Groups, "getstats," retrieved from <http://groups.google.com/group/comp.infosystems.www/browse_thread/thread/1009129de1aaf6aa/ed94b219923cc7d?q=getstats&mum=1 & h1..>, retrieved on May 24, 2006 (3 pages).

Mobasher, "A Taxonomy of Web Mining," retrieved from <http://maya.cs.depaul.edu/~mobasher/webminer/survey/node2.html>, Jul. 16, 1997 (1 pages).

Mobasher, "Pattern Analysis Tool," retrieved from <http://maya.cs.depaul.edu/~mobasher/webminer/survey/node8.html>, Jul. 16, 1997 (1 page).

Mobasher, "Transaction Identification," retrieved from <http://maya.cs.depaul.edu/~mobasher/webminer/survey/node12.html>, Jul. 16, 1997 (1 page).

(56) References Cited

OTHER PUBLICATIONS

Thomson Jr., "Creation of the NSFnet," Commercialization of the Internet, 2000, retrieved from <http://johnthomson.org/j561/NSFcreate-4.html>, retrieved on May 24, 2006 (2 pages).

Thomson Jr., "The Beginning of Commercialization of the NSFnet," Commercialization of the Internet, 2000, retrieved from <http://johnthomson.org/j561/NSFcomm-5.html>, retrieved on May 24, 2006 (1 page).

Thomson Jr., "Criticism of the NSF Grows," Commercialization of the Internet, 2000, retrieved from <http://johnthomson.org/j561/NSFcriticism-6.html>, retrieved on May 24, 2006 (1 page).

Thomson Jr., "The NSF Starts to Change Their Policy," Commercialization of the Internet, 2000, retrieved from <http://johnthomson.org/j561/NSFpolicy-7.html>, retrieved on May 24, 2006 (1 page).

Bl, "An Updated Quick Look at Viola WWW," retrieved from <http://www.w3.org/History/19921103-hyptertext/hypertext/Viola/Review.html>, retrieved on May 24, 2006 (2 pages).

McGrew, "Web Authoring FAQ," The Web Design Group, 2005, posted to comp.infosystems.www.authoring.html, retrieved from File://P:\P DriveFiles\CLIENTS\Nielsen-NetRatings\Settled Cases\Sane Solutions, LLC\ retrieved on Dec. 21, 2006 (59 pages).

International Bureau, International Preliminary Report on Patentability, issued in connection with International Patent Application No. PCT/US2015/015219, mailed Aug. 25, 2016 (9 pages).

United States Patent and Trademark Office, Non-Final Office Action, issued in connection with U.S. Appl. No. 14/866,158, mailed Sep. 23, 2016 (8 pages).

\* cited by examiner

METHODS AND APPARATUS TO CALCULATE VIDEO-ON-DEMAND AND DYNAMICALLY INSERTED ADVERTISEMENT VIEWING PROBABILITY

RELATED APPLICATION

This patent arises from a continuation of U.S. patent application Ser. No. 14/618,658, filed on Feb. 10, 2015, which claims the benefit of U.S. Provisional Application Ser. No. 61/977,916, which was filed on Apr. 10, 2014, U.S. Provisional Application No. 61/940,994, which was filed on Feb. 18, 2014, and U.S. Provisional Application No. 61/938,617, which was filed on Feb. 11, 2014, all of which are hereby incorporated herein by reference in their entireties.

FIELD OF THE DISCLOSURE

This disclosure relates generally to market research, and, more particularly, to methods and apparatus to calculate video-on-demand and dynamically inserted advertisement viewing probability.

BACKGROUND

In recent years, panelist research efforts included installing metering hardware in qualified households that fit one or more demographics of interest. In some cases, the metering hardware is capable of determining which members of the qualified households are exposed to a particular portion of media via one or more button presses on a People Meter by corresponding household member(s) near a media device (e.g., a television).

DETAILED DESCRIPTION

Figure 1:
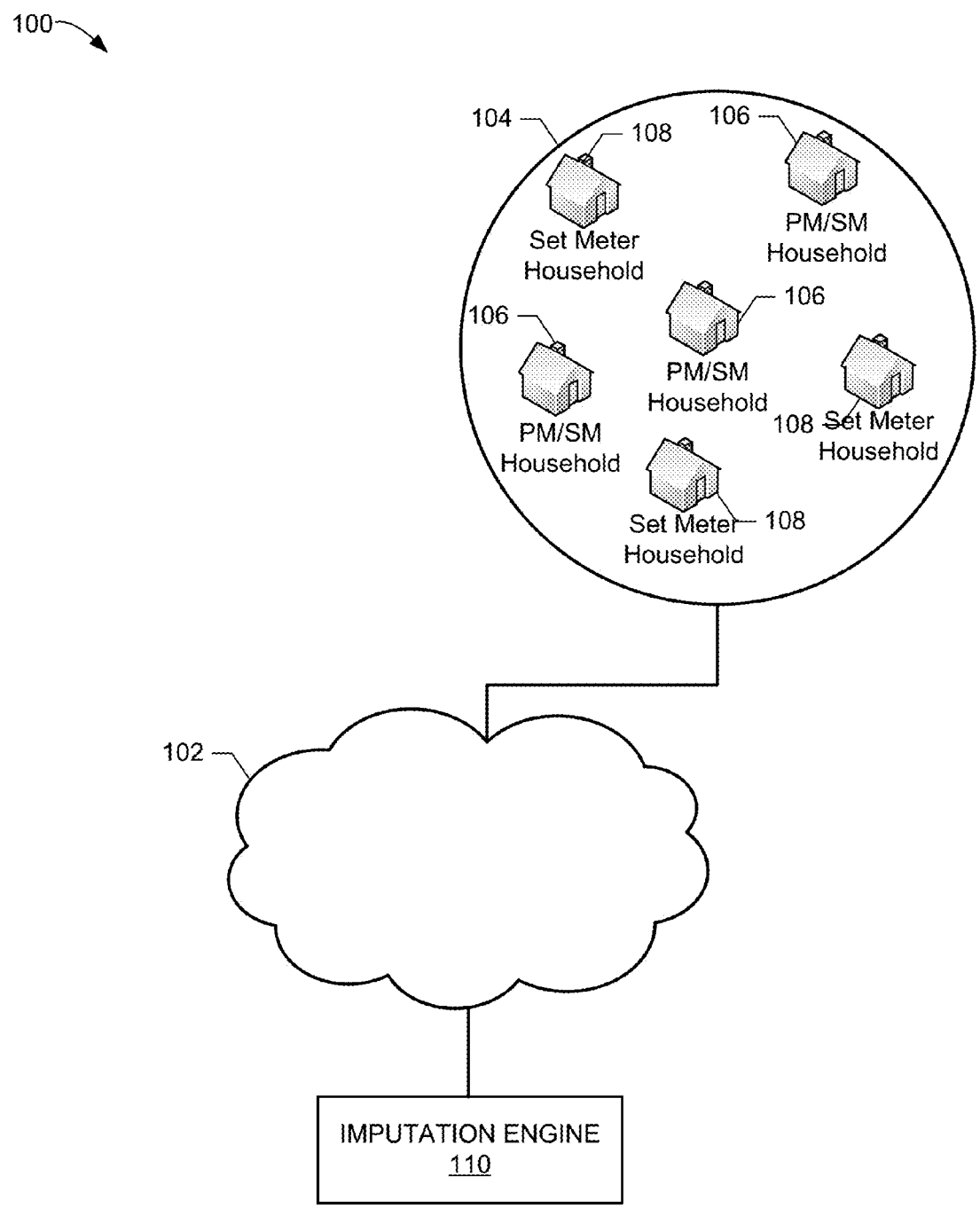
FIG. 1 illustrates an example media distribution environment in which households may be characterized with media meter data.

Market researchers seek to understand the audience composition and size of media, such as radio programming, television programming and/or Internet media. Such information allows the market researchers to report advertising delivery and/or targeting statistics to advertisers that target their media (e.g., advertisements) to audiences. Additionally, such information helps to establish advertising prices commensurate with audience exposure and demographic makeup (referred to herein collectively as "audience configuration"). As used herein, "media" refers to any sort of content and/or advertisement which is presented or capable of being presented by an information presentation device, such as a television, radio, computer, smart phone or tablet. To determine aspects of audience configuration (e.g., which household member is currently watching a particular portion of media and the corresponding demographics of that household member), the market researchers may perform audience measurement by enlisting any number of consumers as panelists. Panelists are audience members (household members) enlisted to be monitored, who divulge and/or otherwise share their media exposure habits and demographic data to facilitate a market research study.

An audience measurement entity (e.g., The Nielsen Company (US), LLC.) typically monitors media exposure habits (e.g., viewing, listening, etc.) of the enlisted audience members via audience measurement system(s), such as one or more metering device(s) and a People Meter. Audience measurement typically involves determining the identity of the media being displayed on a media presentation device (e.g., a television), determining demographic information of an audience, and/or determining which members of a household are to be associated with exposure to particular media.

Some audience measurement systems physically connect to the media presentation device, such as the television, to identify which channel is currently tuned by capturing a channel number, audio signatures and/or codes identifying (directly or indirectly) the programming being displayed. Physical connections between the media presentation device and the audience measurement system may be employed via an audio cable coupling the output of the media presentation device to an audio input of the audience measurement system. Additionally, audience measurement systems prompt and/or accept audience member input to reveal which household member is currently exposed to the media presented by the media presentation device.

As described above, audience measurement entities may employ the audience measurement systems to include a device, such as the People Meter (PM), having a set of inputs (e.g., input buttons) that are each assigned to a corresponding member of a household. The PM is an electronic device that is typically disposed in a media exposure (e.g., viewing) area of a monitored household and is proximate to one or more of the audience members. The PM captures information about the household audience by prompting the audience members to indicate that they are present in the media exposure area (e.g., a living room in which a television set is present) by, for example, pressing their assigned input key on the PM. When a member of the household selects their corresponding input, the PM identifies which household member is present, which includes other demographic information associated with the household member, such as a name, a gender, an age, an income category, etc. However, in the event a visitor is present in the household, the PM includes at least one input (e.g., an input button) for the visitor to select. When the visitor input button is selected, the PM prompts the visitor to enter an age and a gender (e.g., via keyboard, via an interface on the PM, etc.).

The PM may be accompanied by a meter (e.g., a set meter, an active/passive (A/P) meter, a meter within a set top box (STB), a portable people meter (PPM), portable metering via wireless telephones, portable metering via tablets, etc.) capable of measuring media selections presented on the media presentation device. The meter, hereinafter referred to as a set meter, collects tuning data from devices, such as set-top boxes, video game devices, video cassette recorders (VCRs), digital video recorders (DVRs) and/or digital versatile disk (DVD) players. The meter may be associated with any type of panel, such as a national people meter (NPM) panel, a local people meter (LPM) panel, households with third party monitoring entities (e.g., Experian®), and/or any other geographic area of interest. The set meter may monitor which station is tuned, a corresponding time-of-day in which the station is tuned, a duration (e.g., number of minutes) the station is tuned, and/or to identify media associated with the tuned station (e.g., identify a program, an advertisement, etc.). The PM and the set meter may be separate devices and/or may be integrated into a single unit. Audience measurement data captured by the set meter may include tuning information, signatures, codes (e.g., embedded into or otherwise broadcast with broadcast media), while the PM determines a number of and/or identification of corresponding household members exposed to the media output by the media presentation device (e.g., the television).

Data collected by the PM and/or the set meter may be stored in a memory and transmitted via one or more networks, such as the Internet, to a data store managed by the market research entity (e.g., The Nielsen Company (US), LLC). Typically, such data is aggregated with data collected from a large number of PMs monitoring a large number of panelist households. Such collected and/or aggregated data may be further processed to determine statistics associated with household behavior in one or more geographic regions of interest. Household behavior statistics may include, but are not limited to, a number of minutes a household media device was tuned to a particular station, a number of minutes a household media device was used (e.g., viewed) by a household panelist member and/or one or more visitors, demographics of an audience (which may be statistically projected based on the panelist data) and instances when the media device is on or off. While examples described herein employ the term "minutes," such as "household tuning minutes," "exposure minutes," etc., any other time measurement of interest may be employed without limitation.

In an effort to allow collected household data to be used in a reliable manner (e.g., a manner conforming to accepted statistical sample sizes), a relatively large number of PMs are needed. Efforts to increase statistical validity (e.g., by increasing panel size and/or diversity) for a population of interest result in a corresponding increase in money spent to implement panelist households with PMs. In an effort to increase a sample size of household behavior data, example methods, apparatus, systems and/or articles of manufacture disclosed herein employ the set meters to collect household panelist behavior data. Example set meters disclosed herein are distinguished from PMs in that the set meters of panelist households capture behavior data, but do not explicitly identify which one of the household members is actively exposed to media presented on the corresponding media presentation device (e.g., a television). In some examples, the set meter captures codes embedded by one or more entities (e.g., final distributor audio codes (FDAC)), and does not include one or more inputs that are to be selected by one or more household panelists to identify which panelist is currently viewing the media device. Rather than collecting audience composition data directly from panelists, example methods, apparatus, systems and/or articles of manufacture disclosed herein apply one or more models to impute which household members are exposed to particular media programming to collected set meter data. Such example imputation techniques are described in further detail below and referred to herein as "persons imputation." In other words, examples disclosed herein facilitate a manner of determining a probability of household exposure activity in a stochastic manner that takes advantage of available panelist data (e.g., Nielsen® panelist data, Experian® panelist data, advertising provider panelist data, etc.), and avoids the expense of additional PM device installation in panelist households.

Turning to FIG. 1, an example media distribution environment 100 includes a network 102 (e.g., the Internet) communicatively connected to panelist households within a region of interest (e.g., a target research geography 104). In the illustrated example of FIG. 1, some panelist households include People Meters (PMs) and set meters (SMs) 106 and some other panelist households 108 include only SMs to capture household media behavior information (e.g., particular tuned stations, time at which stations are tuned, identification of which media was presented (e.g., programs, advertisements, etc.)). Households having both PMs and SMs are referred to herein as PM/SM households 106. Households (HHs) that do not have a PM, but have a set meter are referred to herein as SM HHs 108. Behavior information collected by the example PM/SMs 106 and the example SM HHs 108 are sent via the example network 102 to an example imputation engine 110 for analysis.

As described in further detail below, the example imputation engine 110 identifies and analyzes panelist data from one or more target research geographies, such as the example target research geography 104 of FIG. 1. While the retrieved and/or otherwise received panelist data includes information that identifies demographic characteristics of corresponding households, only such households that also contain a PM identify which ones of the household members are responsible for particular media consumption. As such, the example imputation engine 110 analyzes the panelist data (e.g., both PM/SM households 106 and SM HHs 108) to facilitate generation of viewing probabilities of particular household members in the SM HHs 108, as described in further detail below. Additionally, the example imputation engine 110 considers viewing behaviors associated with recently telecast video on demand (RTVOD) and the manner in which such behaviors affect viewing probabilities. By determining a manner in which RTVOD affects viewing probabilities, advertising efforts may be implemented and/or otherwise designed by market researchers to target audiences in a more efficient and effective manner, thereby reducing wasted money and advertising campaign efforts that target audiences disinterested and/or otherwise less likely to be consuming the media.

The example SM HHs 108 may include panelists measured and/or otherwise managed by the audience measurement entity (e.g., The Nielsen Company (US), LLC.) and/or one or more other entities that have information that identifies a demographic composition of a corresponding household. In some examples, marketing services companies (e.g., Experian®) collect and manage household information about participating households in a manner compliant with privacy controls to link information with SM HHs to identify a number of household members, corresponding household member ages, genders, education levels, etc. In still other examples, media providers, distributors and/or advertising source agencies collect and manage household information from SM HHs to identify a number of household members, corresponding household member ages, genders, education levels, etc. As described above, because SM HHs 108 do not include PMs, they do not include physical button inputs to be selected by household members to identify which household member is currently watching particular media, and they do not include physical button inputs to be selected by household visitors to identify age and/or gender information. Therefore, example methods, systems, apparatus and/or articles of manufacture disclosed herein model household characteristics that predict a likelihood that a particular household member is watching the identified media (e.g., program, advertisement, etc.) being accessed in the SM HHs 108.

Example households that include a PM will collect panelist audience data that specifically identifies which particular household member is associated with any particular media exposure activity. As used herein, "panelist audience data" includes both (a) media identification data (e.g., code (s) embedded in or otherwise transmitted with media, signatures, channel tuning data, etc.) and (b) person information identifying the corresponding household member(s) and/or visitors that are currently watching/viewing/listening to and/or otherwise accessing the identified media. Additionally, because the PM/SM HHs 106 also include a SM, tuning behavior data is also collected to identify a selected station, a number of minutes tuned to the selected station, and/or time-of-day information associated with the tuning behavior(s). On the other hand, SM HHs 108 include only a SM to collect media data. As used herein, "media data" and/or "media identifier information" are used interchangeably and refer to information associated with media identification (e.g., codes, signatures, etc.), but does not include person information identifying which household member(s) and/or visitors are currently watching/viewing/listening to and/or otherwise accessing the identified media. As described in further detail below, example methods, apparatus, systems and/or articles of manufacture disclosed herein impute person identifying data to media data collected from SM HHs 108.

Although examples disclosed herein refer to collecting codes, techniques disclosed herein could also be applied to systems that collect signatures and/or channel tuning data to identify media (e.g., from an attached device, from a log of a server that provides content, etc.). Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be transmitted with, inserted in, or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A good signature is one that is repeatable when processing the same media presentation, but that is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In some examples, panelist households utilize video-on-demand (VOD) services, which permit media to be displayed within the household in response to a request (e.g., program selection via a menu of the set-top-box). As used herein, "video-on-demand" differs from live telecast media based on an amount of time since the associated live telecast media was originally available. In other words, the VOD services may allow audience members to view movies and/or programs (e.g., sitcom episodes) that have been previously broadcast/telecast live at a prior date and time. In other examples, the VOD services facilitate movie and/or program viewing for media that has not been associated with a prior live broadcast, but instead reflects premium services associated with subscription fees. In some examples, media that is telecast to an audience based on a scheduled date and time is referred to as "live viewing" or "linear viewing." Examples of linear viewing include first-run telecast instances of a sitcom during a regularly scheduled day of week and corresponding time of day.

In the event the first-run telecast media is made available to an audience at a later time, such delayed viewing is referred to as recently telecast VOD (RTVOD), and is associated with a corresponding telecast delay value. In some examples, the telecast delay value occurs moments after the corresponding linear viewing event, such as when an audience member uses a digital video recorder to watch recorded media. In other examples, a media provider provides the audience member with selectable options to choose media that has been previously associated with linear viewing (e.g., a sitcom that was telecast 24-hours earlier). Live telecast media includes certain advertisements that are presented to an audience during the scheduled telecast date and time (e.g., linear viewing associated with a weekly 30-minute sitcom timeslot), in which the advertisements are selected to target expected demographic profiles (e.g., males and females age 26-39). However, demographics of audiences that participate in live telecast viewing differ from demographics of audiences that participate in RTVOD viewing. Further still, the demographics of audiences that use RTVOD of a first telecast delay value measured from the date of live viewing may differ from the demographics of audiences that use RTVOD of a second telecast delay value (e.g., relatively older) measured from the date of live viewing. Knowledge of such audience demographic differences allows audience measurement entities and/or advertisers to target advertisements in a manner that more closely aligns with the demographics to be expected by a viewing audience. In some examples, insertion of advertisements in RTVOD media is referred to as dynamic advertisement insertion, which can be enhanced when a corresponding viewing probability is known for each corresponding RTVOD telecast delay value (e.g., a probability for a demographic profile during linear viewing as distinguished from the probability for the same demographic profile during RTVOD occurring 3 days after a corresponding live event).

While advertisers, advertisement insertion technology entities, audience measurement entities and/or, more generally, market researchers may know the specific demographic composition of a household (e.g., three household members, one male age 33, one female age 32, one male child age 3), unless such households also include a PM, such entities will not know which particular household members are exposed to any particular media displayed within the household. Additionally, in the event that an SM HH 108 requests RTVOD media a day after a corresponding live telecast of that media versus an RTVOD media request three days after the corresponding live telecast of that media, the market researchers will not know which household members are within the audience unless the household also includes a PM. Accordingly, examples disclosed herein identify a viewing probability for respective household members based on, in part, whether the media is a live telecast (linear viewing) or an RTVOD telecast of different durations (delay) from the live/original telecast event.

Figure 2:
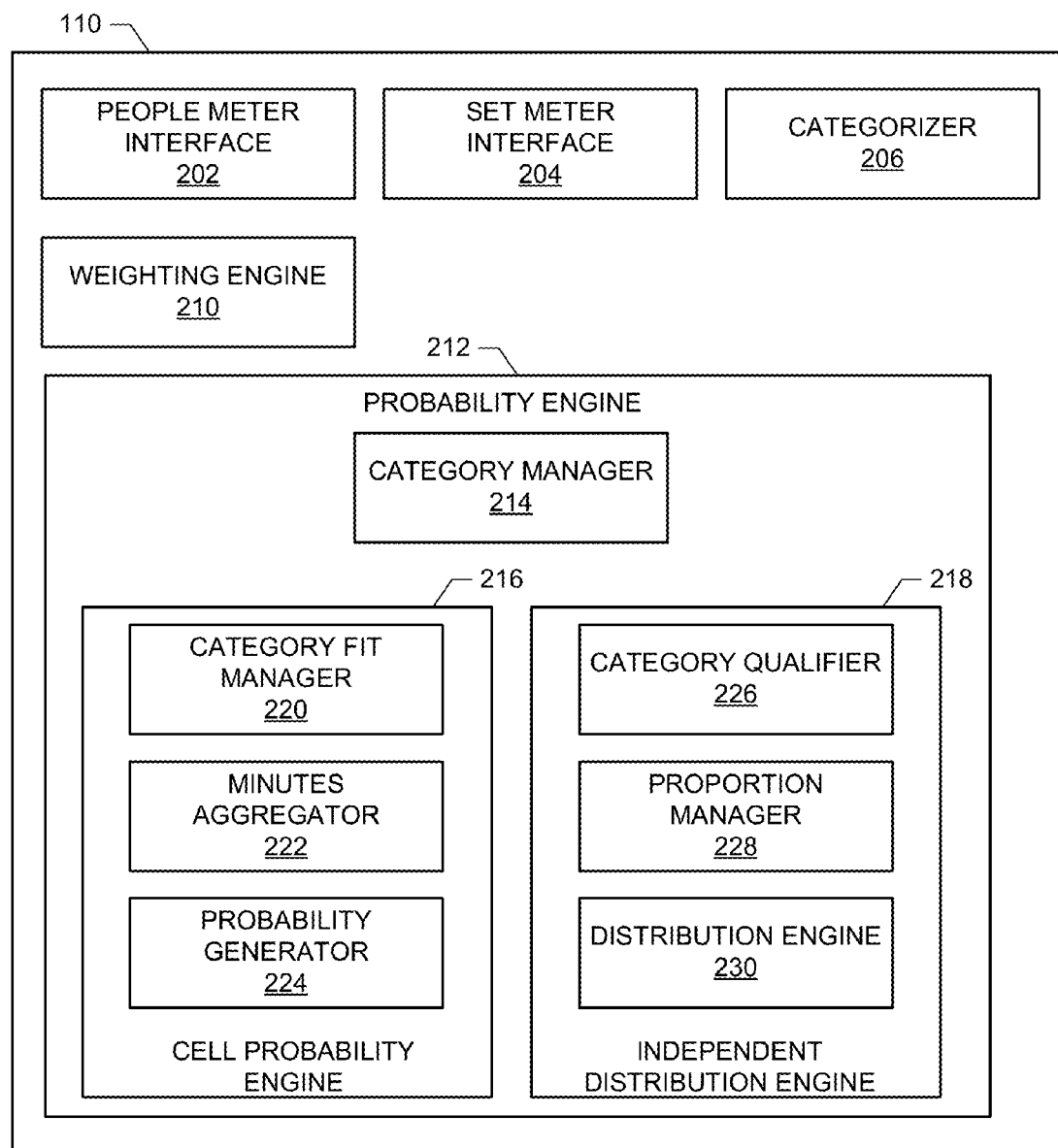
FIG. 2 is a schematic illustration of an example imputation engine constructed in accordance with the teachings of this disclosure.

FIG. 2 is a schematic illustration of an example implementation of the imputation engine 110 of FIG. 1. In the illustrated example of FIG. 2, the imputation engine 110 includes a People Meter (PM) interface 202, a set meter (SM) interface 204, a categorizer 206, a weighting engine 210 and a probability engine 212. The example probability engine 212 of FIG. 2 includes an example dimension manager 214, an example cell probability engine 216 and an example independent distribution engine 218. The example cell probability engine 216 of FIG. 2 includes an example category fit manager 220, an example minutes aggregator 222 and an example probability generator 224. The example independent distribution engine 218 of FIG. 2 includes an example category qualifier 226, an example proportion manager 228 and an example distribution engine 230.

In operation, the example PM interface 202 acquires people meter data from any and all PMs within the example panelist households 104. In particular, the example PM interface 202 acquires PM data from the PM devices located in the example PM/SM households 106 (i.e., households that have both SMs and PM devices). The PM devices have input (s) (e.g., buttons for each household member to select to identify their respective presence in the audience currently exposed to media). In some examples, the PM/SM households 106 are associated with a particular geographic area of focus, such as nationwide (sometimes referred to as a "National People Meter" (NPM)), while in other examples the PM/SM households 106 are associated with a subset of a particular geographic area of focus, such as a localized geography of interest (e.g., a city within a nation (e.g., Chicago), and sometimes referred to as "Local People Meter" (LPM)). Because the acquired data from PM devices in NPMs and/or LPMs utilizes panelists and includes detailed information related to behaviors on a persons level, models and/or probabilities may be generated therefrom.

For example, in the event an analysis of the Charlotte designated market area (DMA) is desired, then the example PM interface 202 captures data from LPM households within a time zone corresponding to the desired DMA (e.g., the Eastern time zone). In some examples, desired data may be streamed back to one or more storage repositories, from which the example imputation engine 110 may retrieve the data. The example PM interface 202 of the illustrated examples collects, acquires and/or otherwise captures PM data (panelist audience data) from panelist households 104 (having both PMs and SMs) and records or aggregates the media exposure minutes to respective persons within the household as one or more of the possible audience members (e.g., viewers) of the corresponding media. In other words, the captured panelist audience data is at a persons-level rather than at a household level, which facilitates an ability to generate person probabilities, as described in further detail below.

The example categorizer 206 of FIG. 2 categorizes the acquired panelist audience data in any number of categories, such as by age, by gender, by whether a household is of size one (e.g., a single person household) or of size two or more (e.g., two or more persons in the household), by a station/affiliate, by live media viewing, by RTVOD viewing (and/or an RTVOD age since live event), by a genre and/or by daypart. In some examples, categories include those related to race, ethnicity, geography, language, metro vs. non-metro, etc. In still other examples, categories include an age of the head of household, a room location (e.g., a living room, a master bedroom, other bedroom, etc.), and/or the presence of children. In the event one or more categories improve results, it may be used for analysis, while categories that do not illustrate improvements or cause negative impacts may be removed during the analysis.

As used herein, categories refer to classifications associated with collected exposure minutes (also known as "viewing minutes"). Categories may include, but are not limited to, a daypart associated with collected exposure minutes (e.g., Monday through Friday from 5:00 AM to 6:00 AM, Sunday from 10:00 PM to 1:00 AM, etc.), a station associated with collected exposure minutes (e.g., WISN, WBBM, etc.), whether the media is live or RTVOD, an age/gender associated with collected exposure minutes (e.g., males age 2-5, females age 35-44, etc.), and a genre (e.g., kids programs, home repair programs, music programs, sports programs, etc.) associated with collected exposure minutes. In still other examples, the categorizer 206 categorizes the acquired panelist audience data by education (e.g., 8 years or less, 9 years to high school graduate, some college to Bachelor degree, master's degree or higher, etc.), life stage (e.g., pre-family, young family, older family, post family, retired, etc.) and/or a number of media presentation devices (e.g., television sets in the household. One or more combinations of station/affiliate/genre/live vs. RTVOD/demographic attribute(s) may be categorized in different ways based on, for example, variations between data available for one or more age/gender levels. For example, some local markets have ten stations in which a sample size for men age 45-54 may exhibit a data sample size of statistical significance for seven of those ten stations. In other examples, a local market may have relatively fewer stations where the age/gender levels are of sufficient size to support statistical significance. In some such examples, the age/gender groupings are adjusted (e.g., from males age 40-45 to males age 40-50) to increase an available sample size to achieve a desired statistical significance.

To impute panelist audience data (e.g., exposure minutes, which is sometimes referred to herein as "viewing minutes") to media data, the example PM interface 202 identifies Local People Meter (LPM) data that has been collected within a threshold period of time. On a relative scale, when dealing with, for example, television exposure, an exposure index, which provides an indication of how well LPM data accurately imputes exposure minutes, may be computed in a manner consistent with Equation (1).

$$\text{Exposure Index} = \frac{\text{No. of imputed } LPM \text{ exposure min. for ea. cat.}}{\text{No. of actual } LPM \text{ exposure min. for ea. cat.}} \quad \text{Equation (1)}$$

In the illustrated example of Equation (1), the exposure index is calculated as the ratio of the number of imputed LPM viewing minutes for each category of interest and the number of actual LPM viewing minutes for each category of interest.

Figure 3:
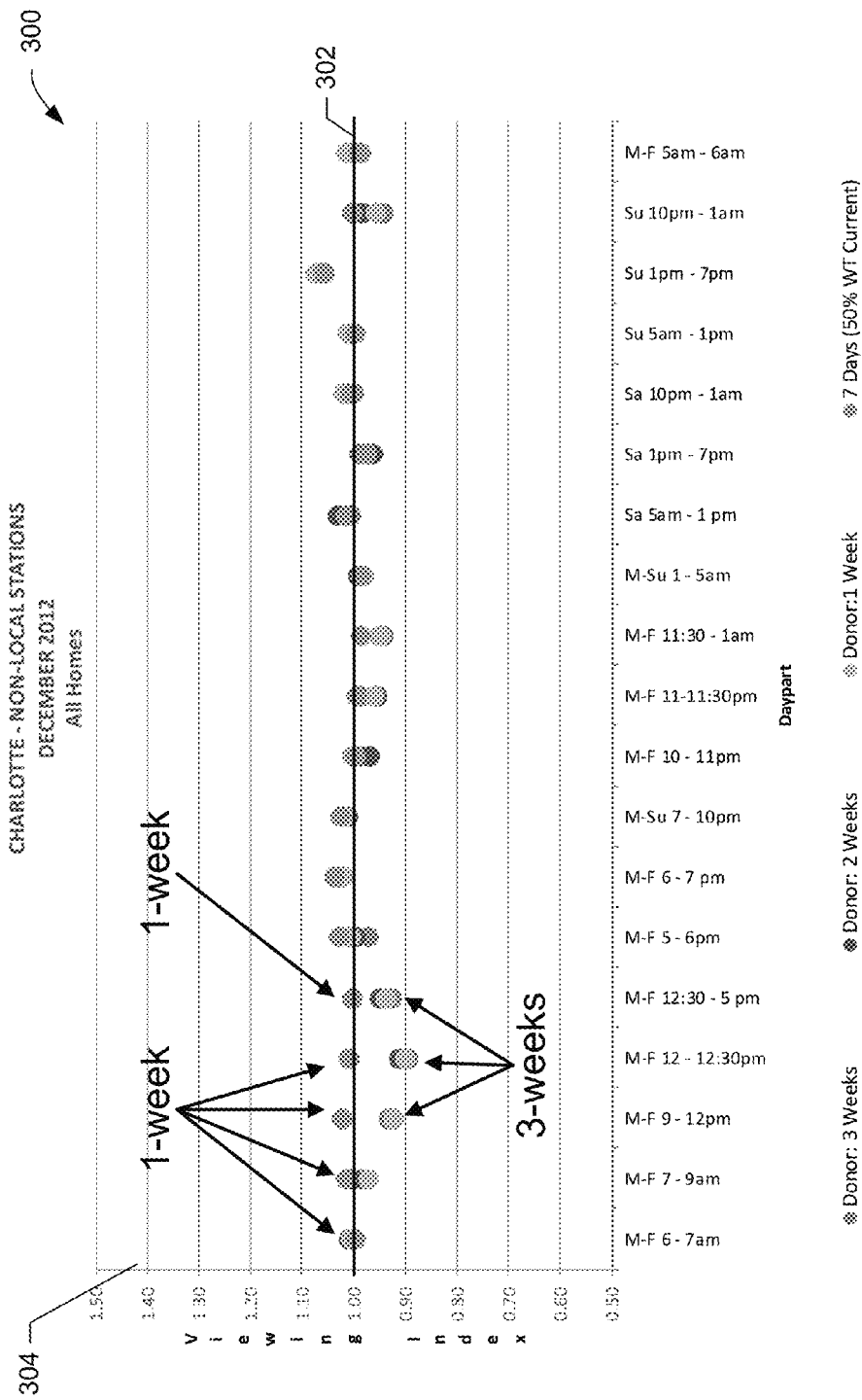
FIG. 3 is a plot illustrating an example viewing index effect based on an age of collected data.

The example exposure index of Equation (1) may be calculated on a manual, automatic, periodic, aperiodic and/or scheduled basis to empirically validate the success and/or accuracy of imputation efforts disclosed herein. Index values closer to one (1) are indicative of a greater degree of accuracy when compared to index values that deviate from one (1). Depending on the type of category associated with the collected exposure minutes, corresponding exposure index values may be affected to a greater or lesser degree based on the age of the collected data. FIG. 3 is an example plot 300 of exposure index values by daypart. In the illustrated example of FIG. 3, the plot 300 includes an x-axis of daypart values 302 and a y-axis of corresponding exposure index values 304. Index value data points labeled "1-week" appear to generally reside closer to index values of 1.00, while index value data points labeled "3-weeks" appear to generally reside further away from index values of 1.00. In other words, panelist audience data that has been collected more recently results in index values closer to 1.00 and, thus, reflects an imputation accuracy better than panelist audience data that has been collected from longer than 1-week ago.

As described above, collected data that is more recent exhibits an imputation accuracy that is better than an imputation accuracy that can be achieved with relatively older collected data. Nonetheless, some data that is relatively older will still be useful, but such older data is weighted less than data that is more recent to reflect its lower accuracy. The example weighting engine 210 applies a temporal weight, and applies corresponding weight values by a number of days since the date of collection. Relatively greater weight values are applied to data that is relatively more recently collected. In some examples, weight values applied to collected tuning minutes and collected exposure minutes are based on a proportion of a timestamp associated therewith. For instance, a proportionally lower weight may be applied to a portion of collected minutes (e.g., tuning minutes, exposure minutes) when an associated timestamp is relatively older than a more recently collection portion of minutes.

Figure 4:
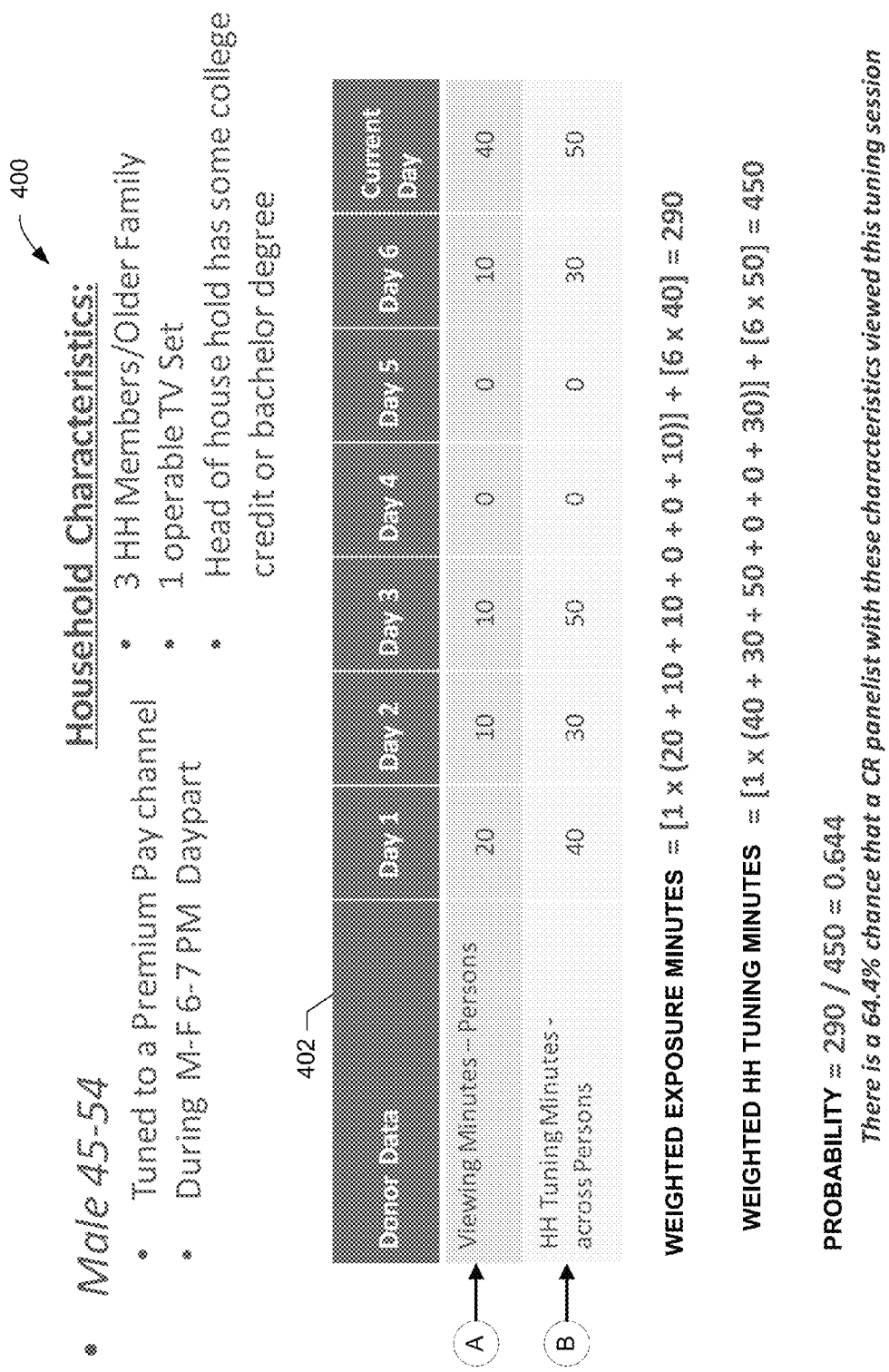
FIG. 4 is an example weighting allocation table to apply a temporal weight to collected minutes.

FIG. 4 illustrates an example weighting allocation table 400 generated and/or otherwise configured by the example weighting engine 210. In the illustrated example of FIG. 4, a PM/SM household 106 acquired exposure minutes (i.e., individualized panelist audience data) via a PM device (row "A"), and an SM household 108 acquired household tuning minutes (i.e., minutes tuned in a household without individualizing to a specific person within that household) via an SM device (row "B"). The example individualized panelist audience and household tuning minutes are collected over a seven (7) day period. In that way, the most recent day (current day 402) is associated with a weight greater than any individualized panelist audience and/or household tuning minutes from prior day(s). The example individualized panelist minutes of row "A" may be further segmented in view of a desired category combination for a given household. As described above, categories that characterize a household may include a particular age/gender, size of household, viewed station, live vs. RTVOD of a certain age, daypart, number of televisions, life stage, education level and/or other demographic attribute(s). For purposes of illustration, examples described below, the household age/gender category for the household is male, age 45-54, and the tuned station is live and associated with a premium pay channel (genre) during the daypart associated with Monday through Friday between 6:00 PM and 7:00 PM.

In the illustrated example of FIG. 4, the weighting engine 210 applies a unitary weight value to the first six (6) days of individualized panelist minutes and household tuning minutes, and applies a weight value of six (6) to the most current day. While a value of six (6) is disclosed above, like the other values used herein, such value is used for example purposes and is not a limitation. In operation, the example weighting engine 210 of FIG. 2 may employ any weighting value in which the most current day value is relatively greater than values for one or more days older than the current day. The example weighting engine 210 may generate a weighted sum of the collected individualized panelist audience exposure minutes (hereinafter referred to herein as "exposure minutes") in a manner consistent with example Equation (2), and may generate a weighted sum of the collected household tuning minutes in a manner consistent with example Equation (3).

$$\text{Exposure Min.} = \left[ W_1 \left( \sum_{d=1}^{n} EM_d \right) \right] + [W_2 EM_c] \quad \text{Equation (2)}$$

$$\text{Tuning Min.} = \left[ W_1 \left( \sum_{d=1}^{n} TM_d \right) \right] + [W_2 TM_c] \quad \text{Equation (3)}$$

In the illustrated examples of Equation (2) and Equation (3), $W_1$ reflects a relatively lower weighting value than $W_2$, in which $W_2$ is the weighting value associated with the current day exposure minutes value. Additionally, d reflects one of n days of the collected data prior to the current day, $EM_d$ reflects exposure minutes for corresponding days prior to the current day, $TM_d$ reflects household tuning minutes for corresponding days prior to the current day, $EM_c$ reflects exposure minutes for the current day, and $TM_c$ reflects household tuning minutes for the current day.

In connection with example data shown in the illustrated example of FIG. 4 (e.g., days one through six having 20, 10, 10, 0, 0 and 10 exposure minutes, respectively, the current day having 40 exposure minutes, days one through six having 40, 30, 50, 0, 0 and 30 household tuning minutes and the current day having 50 household tuning minutes), application of example Equation (2) results in a weighted exposure minutes value of 290 and application of example Equation (3) results in a weighted household tuning minutes value of 450. In some examples, the probability engine 212 calculates an imputation probability that an SM panelist (e.g., a panelist household with only an SM device and no associated PM device) with the aforementioned category combination of interest (e.g., male, age 45-54 tuned (live) to a premium pay channel during Monday through Friday between the daypart of 6:00 PM and 7:00 PM) is actually viewing this tuning session. The imputation probability is calculated by the example probability engine 212 by dividing the weighted exposure minutes (e.g., 290 minutes) by the weighted household tuning minutes (e.g., 450 minutes) to yield a 64.4% chance that the SM panelist with this same household category combination is associated with this tuning behavior. While examples disclosed herein refer to probability calculations, in some examples odds may be calculated to bound results between values of zero and one. For example, odds may be calculated as a ratio of a probability value divided by (1-Probability). If desired, the odds may be converted back to a probability representation.

However, while the market researcher may have a particular category combination of interest, a corresponding probability value accuracy may be improved when different probability calculation techniques are applied in view of corresponding available sample sizes of households sharing the particular category combination of interest. As described in further detail below, if collected LPM data associated with the category combination of interest (e.g., male, age 45-54, tuned (live) to premium channel during 6:00 PM to 7:00 PM with three household members, one television and the head of household have some college credit or a bachelor's degree) is greater than a threshold value, then a cell probability technique may yield a probability value with acceptable accuracy. As used herein, an acceptable accuracy relates to a sample size that is capable and/or otherwise required to establish results having a statistical significance. However, in the event the collected Local People Meter (LPM) data associated with the category combination of interest falls below the threshold value, then the cell probability technique yields unacceptably low probability value accuracy. Instead, example methods, apparatus, systems and/or articles of manufacture disclosed herein employ independent distribution probability calculations when the collected LPM data associated with the category combination of interest is below a threshold value, such as below a threshold value that is capable of facilitating one or more calculations to yield results having statistical significance.

The example category manager 214 of FIG. 2 identifies categories and/or a category combinations of interest and determines whether the particular category combination of interest has a threshold number of households within a donor pool. As described above, the donor pool may be a localized geography (a Local People Meter (LPM), such as the panelist households within the geographic region of interest 104). However, as a geographic region of interest decreases in size, a corresponding number of qualifying households that match the category combination of interest also decreases. In some cases, the number of qualifying households is below a threshold value, which causes one or more probability calculation methods (e.g., cell probability) to exhibit poor predictive abilities and/or results that fail to yield statistical significance. On the other hand, in the event the donor pool of households exceeds a threshold value count, then such probability calculation methods (e.g., cell probability) exhibit satisfactory predictive capabilities under industry standard(s).

In operation, the example category manager 214 of FIG. 2 generates a logical "AND" condition test for a set of categories of interest. For example, if the categories of interest include (1) a particular station tuned live, (2) a particular daypart, (3) a particular number of household members, (4) a particular age, (5) a particular gender, (6) a particular number of television sets in the household, (7) a particular education level of the head of household, and (8) a particular life stage, then the category manager 214 determines whether the combination of all eight categories of interest are represented by a threshold number of households within the donor pool. If so, then the example category manager 214 invokes the example cell probability engine 216 to calculate a probability value of the category combination occurring within SM households 108. Generally speaking, when a number of households sharing the combination of categories of interest (e.g., items (1) through (8) above) are greater than the threshold value, a corresponding level of confidence in probability calculation via the cell probability technique is deemed satisfactory.

In the event a market researcher seeks probability information for a male aged 50 watching a premium pay channel live (not delayed viewing) between the hours of 6:00 PM and 6:30 PM, the example category fit manager 220 of the illustrated example identifies which previously established category groups already exist that would best fit this desired task. In other words, the specific and/or otherwise unique research desires of the market researcher may not align exactly with existing categorical groups collected by LPM and/or NPM devices. Instead, the example category fit manager 220 identifies that the closest categorical combination of industry standard and/or otherwise expected data is with males age 45-54 between the hours of 6:00 PM and 7:00 PM. The example minutes aggregator 222 of the illustrated example identifies a total number of household tuning minutes in all households associated with the identified closest categorical combination, and also identifies a total number of exposure minutes associated with the males age 45-54 in such households. For example, the minutes aggregator 222 may identify forty-five (45) qualifying households that have males 45-54 (e.g., the household could have more than just the males 45-54) in which a premium pay genre station was tuned live between the hours of 6:00 PM to 7:00 PM, three household members with one television set and a head of household having some college credit or bachelor's degree.

Within these forty-five (45) qualifying households, the tuning minutes aggregator 222 may identify two-hundred (200) household tuning minutes total, but only one hundred and two (102) of those minutes were associated with the males 45-54. The example probability generator 224 of the illustrated example calculates a probability for imputation as the ratio of exposure minutes for the males 45-54 and the total household tuning minutes for all qualifying households in a manner consistent with example Equation (4).

$$\text{Probability of Imputation} = \qquad\qquad\text{Equation (4)}$$

| -continued |
| --- |
| Exposure Minutes by Persons of Interest |
| Tuning Minutes of Qualifying Households |

In the illustrated example of Equation (4), the probability of imputation using the examples disclosed above is 0.51 (i.e., 102 exposure minutes divided by 200 tuning minutes, in this example). In some examples, the probability value calculated by the example cell probability engine 216 is retained and/or otherwise imputed to SM households 108 based on a normal distribution, such as a comparison of the calculated probability value to a random or pseudo-random number. In the event the calculated probability value is greater than the random number, then the household member having the categorical combination of interest is credited as viewing a tuning segment. In other words, the household tuning data is imputed to the SM household 108 as exposure data for the categorical combination of interest. On the other hand, in the event the calculated probability value is less than the random or pseudo-random number, then the household member having the categorical combination of interest is not credited as viewing the tuning segment. In other words, the household tuning data is not imputed to the SM household 108.

As discussed above, when the combinations of all categories of interest are represented by a number of households less than a threshold value within the donor pool, the cell probability calculation approach may not exhibit a level of confidence deemed suitable for statistical research. Generally speaking, a number of households in a research geography of interest matching a single one of the categories of interest may be relatively high. However, as additional categories of interest are added, the number of households having an inclusive match for all such categories decreases. In some circumstances, the number of matching households available in the donor pool after performing a logical "AND" of all categories of interest eventually results in a donor pool having a population lower than a threshold value, which may not exhibit statistical confidence when applying the cell probability technique described above. In such examples, the probability engine 212 prevents a cell probability technique from being employed to calculate a probability of whether a household of interest should be credited with exposure behavior for the categorical combination of interest (e.g., whether the male age 45-54 of the household should be credited with captured exposure (tuning) behavior of the household). Instead, the example probability engine 212 invokes the example independent distribution engine 218 when the number of households having the desired combination of categories of interest is below a threshold value. As described in further detail below, instead of using a pool of households that match all categories of interest, households are employed that match some of the categories of interest are used when calculating a probability of viewing.

In operation, the example category qualifier 226 of FIG. 2 identifies all households within the donor pool (e.g., within the LPM collection geography, such as the Charlotte DMA) that have the same set of key predictors (i.e., particular categories within the set of categories of interest). In some examples, key predictors reflect a set of categories that exhibit a relatively greater degree of success than other combinations of categories. For instance, a first set of key predictors may include a first set of categories related to a geography of interest, such as sunscreen products in geographic vicinity to ocean vacation areas, or skiing products in geographic vicinity to mountain ranges. While examples disclosed herein refer to a Local People Meter (LPM), such examples are not limited thereto. In some examples, a National People Meter (NPM) may be employed as a collection geography that reflects a relatively larger area, such as a nation. In particular, a subset of the example eight (8) original categories of interest may include (1) households matching a household size category, (2) households matching a same member gender category, and (3) households matching a same member age category. In other words, while the original eight example categories of interest included the aforementioned three categories, the remaining categories are removed from consideration when identifying households from the available data pool. For example, the remaining categories are removed that are related to (4) households matching a same live tuned station category, (5) households matching a same education category, (6) households matching a same number of television sets category, (7) households matching a same daypart category, and (8) households matching a same life stage/household size category.

Because, in the illustrated example, the donor pool is constructed with only SM households 106, the example category qualifier 226 retrieves and/or otherwise obtains a total household tuning minutes value and a total exposure minutes value for the available households meeting the size/gender/age criteria of interest (e.g., dimensions (1), (2) and (3) from above). For example, if the size/gender/age criteria of interest is for a household size of two or more people having a male age 45-54, then the example category qualifier 226 identifies a number of households from that size/gender/age subset.

Figure 5:
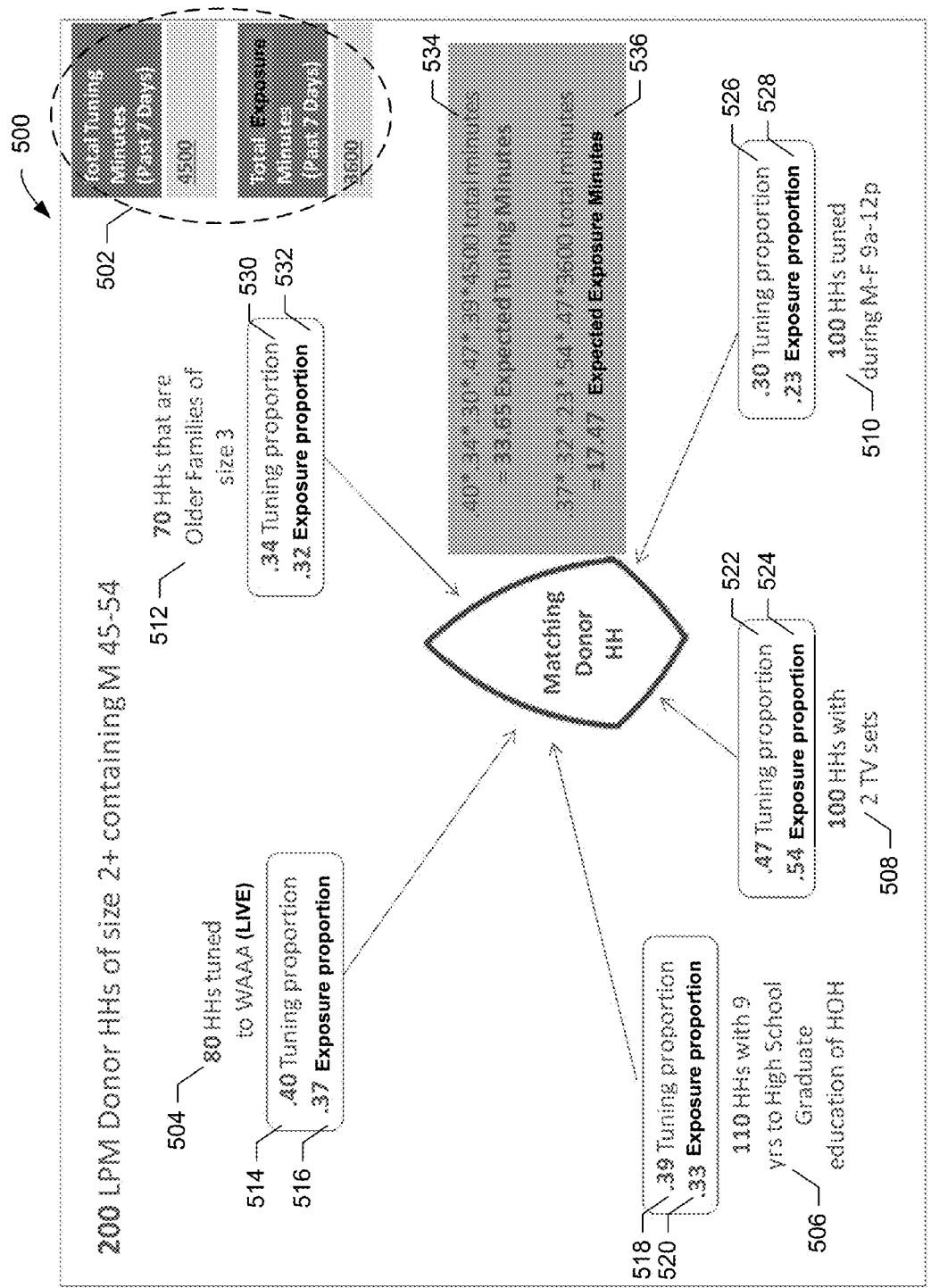
FIG. 5 is an example dimension subset map to illustrate independent distribution of household dimensions used to characterize households with media meter data.

FIG. 5 illustrates an example category subset map 500 created by the independent distribution engine 226 of the example of FIG. 2. The example independent distribution engine assembles household tuning minutes and exposure minutes from subsets of the categories of interest. In the illustrated example of FIG. 5, the map 500 includes a total household tuning minutes count and a total exposure minutes count associated with the key predictor categories 502 of size/age/gender. In this example, the category qualifier 226 identified a total of two-hundred (200) households matching the size/gender/age criteria. While the illustrated example of FIG. 5 includes key predictors related to household size, household member age, and household member gender, examples disclosed herein are not limited thereto. In some examples, a market researcher may be seeking specific information that is also related to whether specific media content was played in the household, such as a particular telecast (either live or RTVOD) sitcom, or a particular commercial. In other words, when the particular media is selected as one of the key predictors, the market researcher may perform the analysis to determine specific viewing probabilities of specific demographics of the audience. Continuing with the example key predictors of FIG. 5, the two-hundred households matching the specific selection of key predictors (i.e., a household having 2+ members containing a male of age 45-54) include a total of 4500 tuning minutes (i.e., minutes that identify a live tuned station but do not identify a corresponding household member) and a total of 3600 exposure minutes (e.g., minutes for an identified live station and also identified individuals who were present in the audience).

The example proportion manager 228 of FIG. 2 selects one or more remaining categories of interest that fall outside the key predictor categories to determine corresponding available matching households, household tuning minutes and exposure minutes. The example remaining categories may be referred to as secondary predictors or secondary categories that affect the probability of media exposure. While example key predictor categories disclosed herein include household size, gender and age, example methods, apparatus, systems and/or articles of manufacture may include any other, additional and/or alternate type(s) of categories for the key predictors. For instance, in the event the market researcher seeks to determine a viewing probability associated with a specific media program, or a specific advertisement, then examples disclosed herein may assemble and/or otherwise generate key predictor categories to include only such instances when the media of interest (e.g., program, advertisement, etc.) was displayed. Additionally, while example secondary categories disclosed herein include live tuned station, RTVOD viewing of a particular duration since the live telecast event (e.g., RTVOD 1-day after a corresponding live telecast, RTVOD 3-days after the corresponding live telecast, etc.), education, number of media presentation devices (e.g., TV sets), daypart and lifestage, example methods, apparatus, systems and/or articles of manufacture may additionally and/or alternatively include any other type of categories as the secondary categories.

For example, the proportion manager 228 of the illustrated example selects one or more secondary categories to determine a corresponding number of matching households, household tuning minutes and exposure minutes. Again, and as described above, the temporal units of "minutes" are employed herein as a convenience when discussing example methods, apparatus, systems and/or articles of manufacture disclosed herein, such that one or more additional and/or alternative temporal units (e.g., seconds, days, hours, weeks, etc.) may be considered, without limitation. In the illustrated example of FIG. 5, a live tuned station category 504 (e.g., one of the secondary categories of interest) is identified by the proportion manager 228 to have eighty (80) households, which match the desired station of interest (e.g., station "WAAA"), in which those households collected 1800 household tuning minutes and 1320 exposure minutes. Additionally, the example proportion manager 228 of FIG. 2 selects an education category 506 (e.g., one of the secondary categories of interest) and determines that one-hundred and ten (110) households match the desired education level of interest (e.g., households in which the head of household has 9 years of school to high school graduation), in which those households collected 1755 household tuning minutes and 1200 exposure minutes. Further, the example proportion manager 228 of FIG. 2 selects a number of television sets category 508 (e.g., one of the secondary categories of interest) and determines that one-hundred (100) households match the desired number of TV sets within a household value, in which those households collected 2100 household tuning minutes and 1950 exposure minutes. Other example categories considered by the example proportion manager 228 of FIG. 2 include a daypart category 510 (e.g., one of the secondary categories of interest), in which the proportion manager 228 of FIG. 2 determines that one-hundred (100) households match the desired daypart category, in which those households collected 1365 household tuning minutes and 825 exposure minutes. The example proportion manager 228 of FIG. 2 also selects a life stage/household size category 512 (e.g., one of the secondary categories of interest) and determines that seventy (70) households match the desired type of life stage/household size value, in which those households collected 1530 household tuning minutes and 1140 exposure minutes.

Generally speaking, the proportion manager 228 of the illustrated example identifies secondary category contributions of household tuning minutes and exposure minutes independently from the household tuning and exposure minutes that may occur for only such households that match all of the desired target combination of categories of interest. After each individual secondary category contribution household tuning minute value and exposure minute value is identified, the example distribution engine 230 calculates a corresponding household tuning proportion and exposure proportion that is based on the key predictor household tuning and exposure minute values. As described in further detail below, the example distribution engine 230 calculates a household tuning proportion and an exposure proportion associated with each of the secondary categories of interest (e.g., the live tuned station category 504, the education category 506, the number of sets category 508, the daypart category 510 and the life stage/size category 512). In other words, examples disclosed herein capture, calculate and/or otherwise identify contributory effects of one or more secondary categories of interest by calculating and/or otherwise identifying a separate corresponding tuning proportion and separate corresponding exposure proportion for each one of the secondary categories. As described in further detail below, separate contributory effects of the one or more secondary categories are aggregated to calculate expected tuning minutes and expected exposure minutes.

In the illustrated example of FIG. 5, the distribution engine 230 divides the household tuning minutes associated with the live tuned station category 504 (e.g., 1800 household tuning minutes) by the total household tuning minutes associated with the key predictor categories 502 (e.g., 4500 household tuning minutes) to calculate a corresponding live tuned station category exposure proportion 514. Additionally, the distribution engine 230 of the illustrated example divides the exposure minutes associated with the live tuned station category 504 (e.g., 1320 exposure minutes) by the total exposure minutes associated with the key predictor categories 502 (e.g., 3600 household viewing minutes) to calculate a corresponding live tuned station category viewing proportion 516. For the sake of example, the calculated live tuned station category tuning proportion 514 is 0.40 (e.g., 1800 household tuning minutes divided by 4500 total exposure minutes) and the calculated live tuned station category viewing proportion 516 is 0.37 (e.g., 1320 exposure minutes divided by 3600 total exposure minutes).

The example distribution engine 230 of FIG. 2 also calculates a household tuning proportion and exposure proportion in connection with the example education category 506. In the illustrated example of FIG. 5, the distribution engine 230 divides the household tuning minutes associated with the education category 504 (e.g., 1755 household tuning minutes) by the total household tuning minutes associated with the key predictor categories 502 (e.g., 4500 household tuning minutes) to calculate a corresponding education category household tuning proportion 518. Additionally, the example distribution engine 230 of the illustrated example divides the exposure minutes associated with the education category 506 (e.g., 1200 exposure minutes) by the total exposure minutes associated with the key predictor categories 502 (e.g., 3600 exposure minutes) to calculate a corresponding education category exposure proportion 520. For the sake of example, the calculated education category household tuning proportion 518 is 0.39 (e.g., 1755 household tuning minutes divided by 4500 total household tuning minutes) and the calculated education category exposure proportion 520 is 0.33 (e.g., 1200 exposure minutes divided by 3600 total exposure minutes).

The example distribution engine 230 of FIG. 2 also calculates a household tuning proportion and exposure proportion in connection with the example household sets category 508. In the illustrated example of FIG. 5, the distribution engine 230 divides the household tuning minutes associated with the household sets category 508 (e.g. 2100 household tuning minutes) by the total household tuning minutes associated with the key predictor categories 502 (e.g., 4500 household tuning minutes) to calculate a corresponding household sets category household tuning proportion 522. Additionally, the example distribution engine 230 of the illustrated example divides the exposure minutes associated with the household sets category 508 (e.g., 1950 exposure minutes) by the total exposure minutes associated with the key predictor categories 502 (e.g., 3600 exposure minutes) to calculate a corresponding household sets category exposure proportion 524. For the sake of example, the calculated household sets category household tuning proportion 522 is 0.47 (e.g., 2100 household tuning minutes divided by 4500 total household tuning minutes) and the calculated household sets category exposure proportion 524 is 0.54 (e.g., 1950 exposure minutes divided by 3600 total exposure minutes).

The example distribution engine 230 of FIG. 2 also calculates a household tuning proportion and exposure proportion in connection with the example daypart category 510. In the illustrated example of FIG. 5, the distribution engine 230 divides the household tuning minutes associated with the daypart category 510 (e.g., 1365 household tuning minutes) by the total household tuning minutes associated with the key predictor categories 502 (e.g., 4500 household tuning minutes) to calculate a corresponding daypart category household tuning proportion 526. Additionally, the example distribution engine 230 of FIG. 2 divides the exposure minutes associated with the daypart category 510 (e.g., 825 exposure minutes) by the total exposure minutes associated with the key predictor categories 502 (e.g., 3600 exposure minutes) to calculate a corresponding daypart category exposure proportion 528. For the sake of example, the calculated daypart category household tuning proportion 526 is 0.30 (e.g., 1365 household tuning minutes divided by 4500 total household tuning minutes) and the calculated daypart category exposure proportion 528 is 0.23 (e.g., 825 exposure minutes divided by 3600 total exposure minutes).

The example distribution engine 230 of FIG. 2 also calculates a household tuning proportion and exposure proportion in connection with the example life stage/size category 512. In the illustrated example of FIG. 5, the distribution engine 230 divides the household tuning minutes associated with the life stage/size category 512 (e.g. 1530 household tuning minutes) by the total household tuning minutes associated with the key predictor categories 502 (e.g., 4500 household tuning minutes) to calculate a corresponding life stage/size category household tuning proportion 530. Additionally, the example distribution engine 230 of FIG. 2 divides the exposure minutes associated with the life stage/size category 512 (e.g., 1140 exposure minutes) by the total exposure minutes associated with the key predictor categories 502 (e.g., 3600 exposure minutes) to calculate a corresponding life stage/size category exposure proportion 532. In this example, the calculated life stage/size category tuning proportion 530 is 0.34 (e.g., 1530 household tuning minutes divided by 4500 total household tuning minutes) and the calculated life stage/size category exposure proportion 532 is 0.32 (e.g., 1140 exposure minutes divided by 3600 total exposure minutes).

As described above, each of the target combinations of categories of interest has an independently calculated household tuning proportion value and an independently calculated exposure proportion value. The example distribution engine 230 of FIG. 2 calculates the product of all household tuning proportion values (e.g., the tuned station category household tuning proportion 514, the education category household tuning proportion 518, the household sets category household tuning proportion 522, the daypart category household tuning proportion 526, and the life stage/size category household tuning proportion 530) to determine total expected household tuning minutes 534. Additionally, the example distribution engine 230 of FIG. 2 calculates the product of all household exposure proportion values (e.g., the tuned station category exposure proportion 516, the education category exposure proportion 520, the household sets category exposure proportion 524, the daypart category exposure proportion 528, and the life stage/size category exposure proportion 532) to determine total expected exposure minutes 536. A final independent distribution is calculated by the example distribution engine 230 in a manner consistent with example Equation (5), and reflects a panelist behavior probability associated with the target combination of categories of interest.

$$\text{Independent Distribution Probability} = \frac{\text{Expected Exposure Minutes}}{\text{Expected Household Tuning Minutes}} \quad \text{Equation (5)}$$

In the example exposure and household tuning minutes discussed above, the resulting independent distribution probability is 0.52. In effect, the resulting independent distribution probability is interpreted as a male 45-54 who lives in a three (3) person household, classified as an older family, with a head of house education of nine (9) years to high school graduate, with two (2) television sets in the household, has a 52% likelihood of watching station WAAA live during the daypart of Monday through Friday from 9:00 AM to 12:00 PM.

While an example manner of implementing the imputation engine 110 of FIG. 1 is illustrated in FIGS. 2-5, one or more of the elements, processes and/or devices illustrated in FIG. 2 may be combined, divided, re-arranged, omitted, eliminated and/or implemented in any other way. Further, the example people meter interface 202, the example categorizer 206, the example weighting engine 210, the example media meter interface 204, the example probability engine 212, the example category manager 214, the example cell probability engine 216, the example category fit manager 220, the example minutes aggregator 222, the example probability generator 224, the example independent distribution engine 218, the example category qualifier 226, the example proportion manager 228, the example distribution engine 230 and/or, more generally, the example imputation engine 110 of FIGS. 1 and 2 may be implemented by hardware, software, firmware and/or any combination of hardware, software and/or firmware. Thus, for example, any of the example people meter interface 202, the example categorizer 206, the example weighting engine 210, the example media meter interface 204, the example probability engine 212, the example category manager 214, the example cell probability engine 216, the example category fit manager 220, the example minutes aggregator 222, the example probability generator 224, the example independent distribution engine 218, the example category qualifier 226, the example proportion manager 228, the example distribution engine 230 and/or, more generally, the example imputation engine 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example people meter interface 202, the example categorizer 206, the example weighting engine 210, the example media meter interface 204, the example probability engine 212, the example category manager 214, the example cell probability engine 216, the example category fit manager 220, the example minutes aggregator 222, the example probability generator 224, the example independent distribution engine 218, the example category qualifier 226, the example proportion manager 228, the example distribution engine 230 and/or, more generally, the example imputation engine 110 is/are hereby expressly defined to include a tangible computer readable storage device or storage disk such as a memory, a digital versatile disk (DVD), a compact disk (CD), a Blu-ray disk, etc. storing the software and/or firmware. Further still, the example imputation engine 110 of FIGS. 1 and 2 may include one or more elements, processes and/or devices in addition to, or instead of, those illustrated in FIGS. 1 and 2, and/or may include more than one of any or all of the illustrated elements, processes and devices.

Flowcharts representative of example machine readable instructions for implementing the imputation engine 110 of FIGS. 1 and 2 are shown in FIGS. 6-10. In these examples, the machine readable instructions comprise a program for execution by a processor such as the processor 1212 shown in the example processor platform 1200 discussed below in connection with FIG. 12. The program(s) may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 6-10, many other methods of implementing the example imputation engine 110 may alternatively be used. For example, the order of execution of the blocks may be changed, and/or some of the blocks described may be changed, eliminated, or combined.

As mentioned above, the example processes of FIGS. 6-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 6:
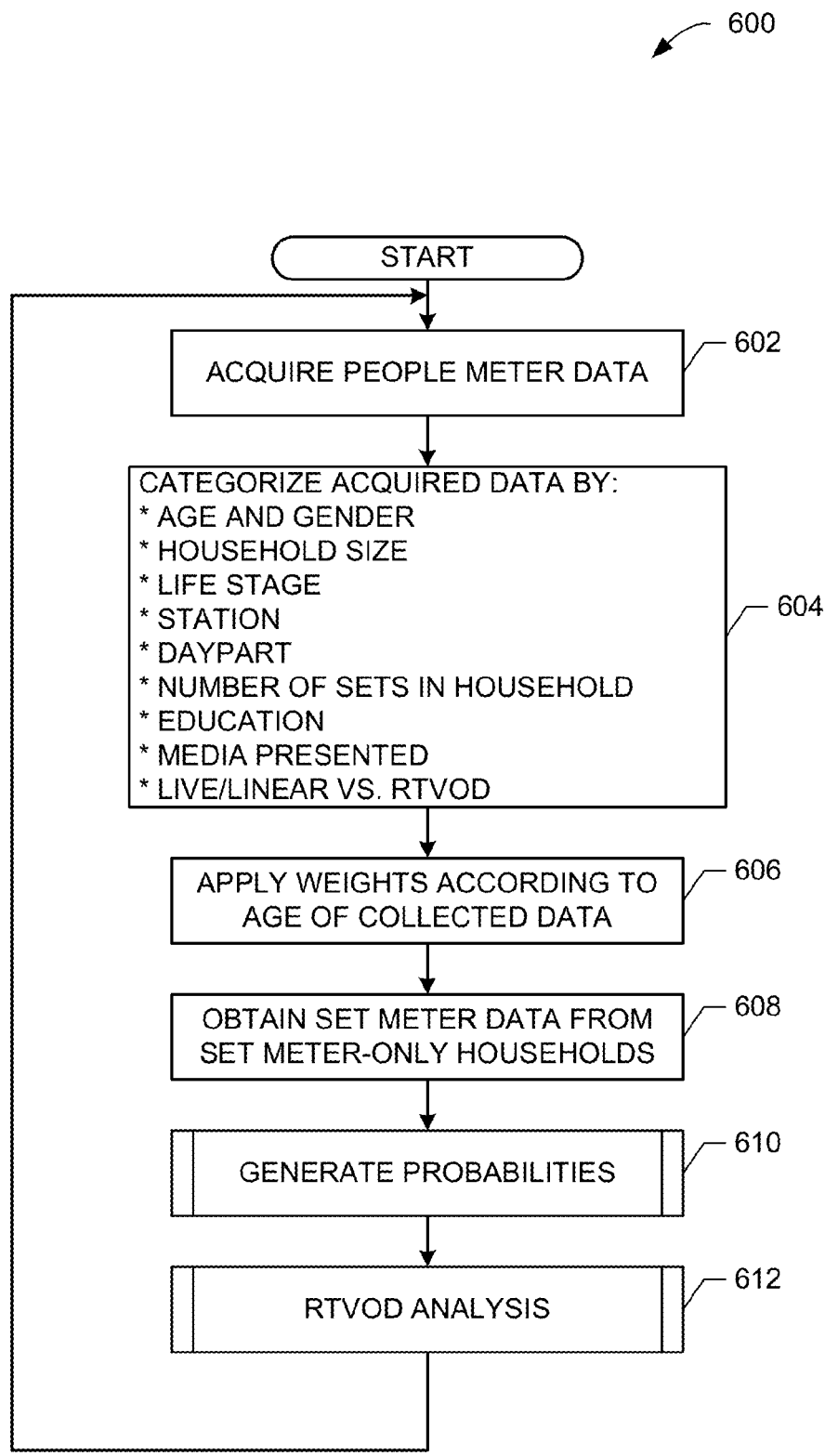
FIGS. 6-10 are flowcharts representative of example machine readable instructions that may be executed to implement the example imputation engine of FIGS. 1 and 2.

The program 600 of FIG. 6 begins at block 602 where the example people meter interface 202 acquires PM data associated with household members from the PM devices located in the example PM/SM households 106 that have both SM devices and PM devices. As described above, the PM devices have input(s) (e.g., buttons for each household member and a visitor button to identify their respective presence in the audience currently exposed to media). The example PM interface 202 identifies collected data that is within a threshold period of time from a current day in an effort to weight such data according to its relative age. As described above in connection with example Equation (1), an accuracy of the viewing index is better when the corresponding collected data is more recent. The example categorizer 206 categorizes the acquired PM data based on one or more categories of interest (block 604). In some examples, the categorizer 206 categorizes and/or otherwise identifies particular households associated with one or more categories, such as an age/gender combination of interest, a particular household size of interest, a particular life stage of interest, a particular viewed station/affiliate/genre of interest, whether media was viewed live or time-shifted (e.g., RTVOD), whether RTVOD viewing occurred within a particular amount of time since a corresponding live telecast event (e.g., VOD 1-day after a corresponding live telecast, VOD 3-days after the corresponding live telecast, VOD 7-days after the corresponding live telecast, etc.), a particular daypart of interest, a number of television sets of interest within the household (e.g., households with one television set, households with 2-3 television sets, households with three or more television sets, etc.), and/or an education level of the head of household. While a relatively large number of PM/SM households 106 will have at least one of the aforementioned categories, a substantially smaller number of PM/SM households 106 will represent all of the target combination of categories of interest to a market researching during a market study.

As described above in connection with FIG. 4, the example weighting engine 210 applies weights in proportions that are based on a number of days since the date of collection of the donor data (block 606). The example media meter interface 204 also acquires household tuning data from SMs in the SM households 108 (block 608). Depending on whether a threshold number of households exist in the donor pool (e.g., the donor pool of PM/SM households in the region of interest 104) that match all of the categories of interest, the example probability engine 212 will invoke a corresponding probability calculation technique (block 610)

as described in further detail below in connection with FIG. 7. After one or more probabilities have been calculated and/or otherwise generated, the example probability engine 212 invokes an RTVOD analysis (block 612) to determine one or more effects of RTVOD behavior on viewing probability, as described in further detail below in connection with FIG. 10.

Figure 7:
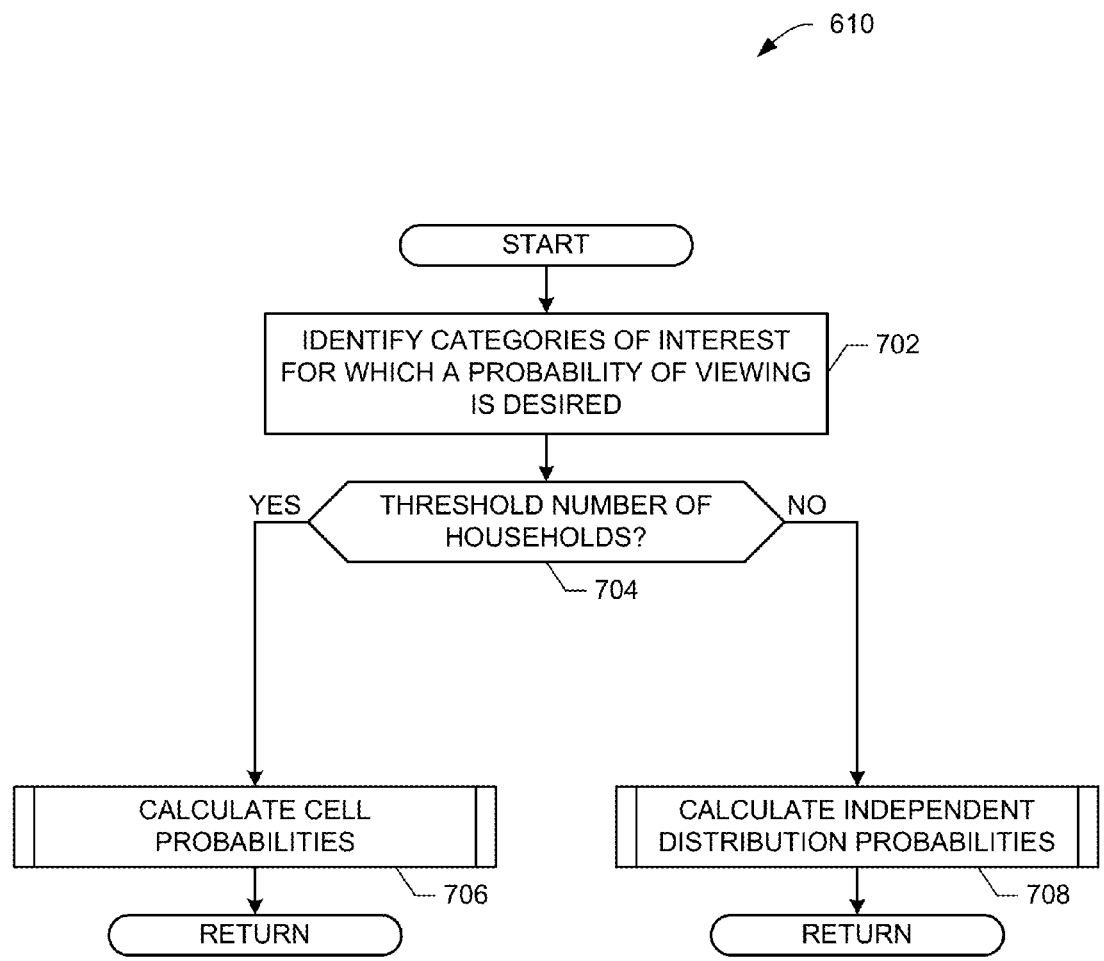

FIG. 7 includes additional detail from the illustrated example of FIG. 6. When generating probabilities, the example category manager identifies categories of interest to use. Generally speaking, example methods, apparatus, systems and/or articles of manufacture disclosed herein generate probabilities based on a target combination of categories of interest such as, for example, determining the likelihood of viewing for (1) a male age 45-54 (2) who lives in a three-person household, (3) classified as an older family (4) with the head of the household having an education of nine (9) years of school to high-school graduate, (5) with two television sets in the household and (6) is watching station WAAA live (i.e., not time-shifted) (7) between the daypart of 9:00 AM to 12:00 PM. In other examples, a market researcher may be seeking probability of viewing information for specific advertisements or programs (e.g., sitcoms). Each advertisement and/or media program presented via a set-top-box (either in the PM/SM HHs 106 or in the SM HHs 108) is associated with a watermark that may be detected by the SM. Accordingly, each instance of presentation of such media of interest (e.g., an advertisement and/or media program) may be accounted for when played back in a household. Additionally, if the media of interest is played back via a RTVOD service provided by the STB, specific probabilities associated with particular demographic combinations may be determined. For instance, a probability of viewing a particular sitcom during a live telecast may have a relatively high value for males and females age 45-59. However, a probability of viewing that same sitcom during RTVOD 1-day after the live telecast may have a relatively high value for males and females age 21-29, thereby reflecting alternate advertising strategies for the same media of interest.

The example category manager 214 identifies categories of interest for which a probability of viewing (exposure) is desired (block 702), such as the example seven categories referred-to above. Based on the identified target combination of categories of interest, such as the example above having the male age 45-54 et al., the example category manager 214 determines whether the available pool of data, previously weighted by the example weighting engine 210, includes a threshold number of households that match all (e.g., all seven) of the target combination of categories of interest (block 704). In some examples, the categories of interest for which a probability is desired includes specific media (e.g., a specific program, a specific advertisement). When the example category manager 214 identifies the categories of interest, a corresponding watermark may be used as search criteria when identifying the threshold number of households (block 704). As such, a first iteration of the example program 600 of FIG. 6 may identify the probability of viewing during the live telecast. However, in the event a second iteration of the example program 600 of FIG. 6 is performed for the same media of interest, but during an instance of RTVOD that occurs 6-days after the initial telecast, a second probability of viewing may result that would suggest an alternate marketing strategy is needed (e.g., the first iteration was relatively high for males age 45-54, but the second iteration was relatively low for males age 45-54, suggesting that the males age 45-54 do not readily participate in RTVOD services).

Assuming, for the sake of example, the threshold number of households to match all of the categories of interest is thirty (30), and the pool of data includes that threshold amount of available households (block 704), the example cell probability engine 216 is invoked by the probability engine 212 to calculate a probability value via a cell probability technique (block 706). On the other hand, if the pool of data does not satisfy the threshold amount of thirty households (e.g., has less than 30 households) (block 704), then the example probability engine 212 invokes the example independent distribution engine 218 to calculate a probability value via an independent distribution technique (block 708).

Figure 8:
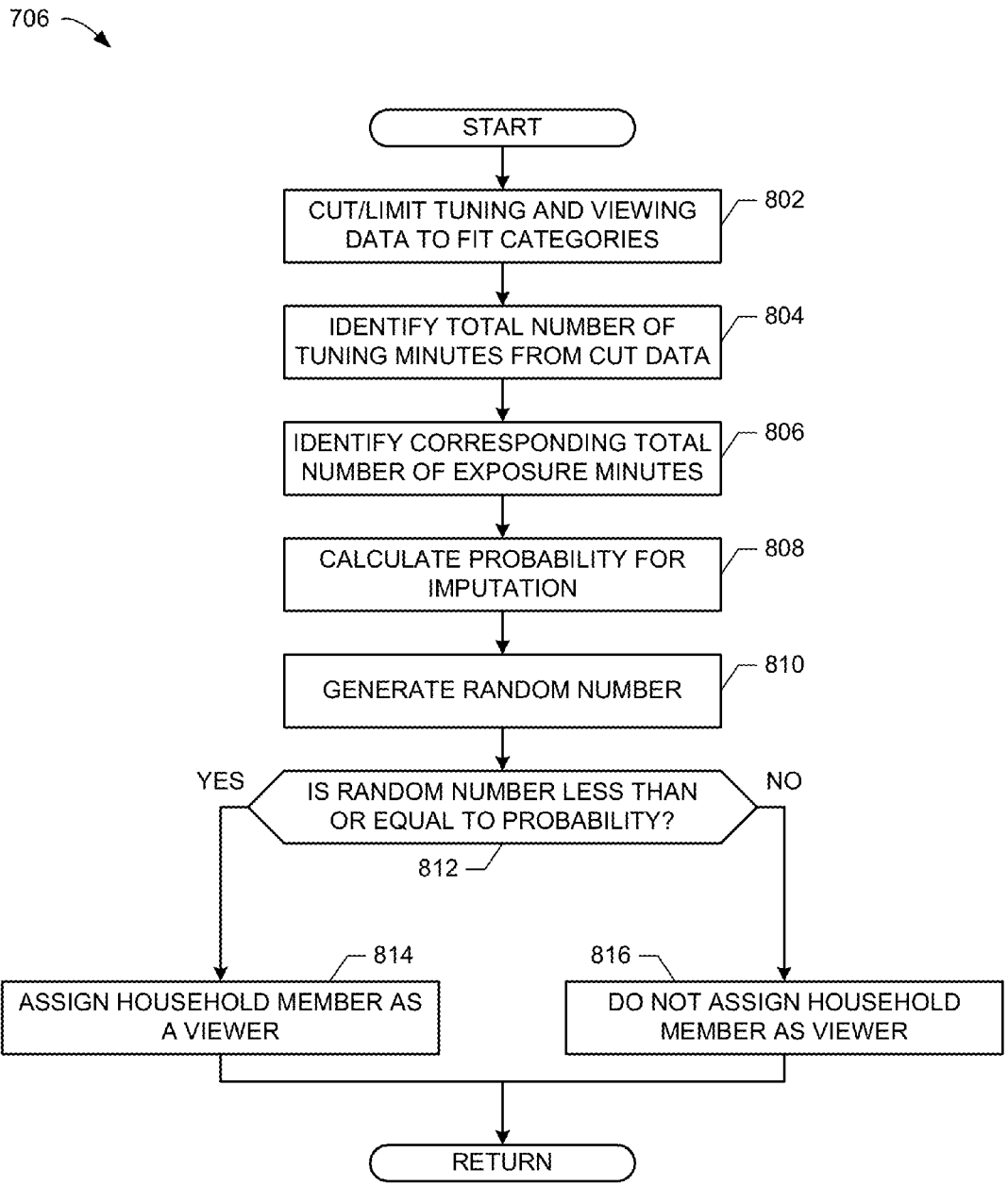

FIG. 8 illustrates an example manner of implementing the cell probability calculation (block 706) of FIG. 7. In the illustrated example of FIG. 8, the category fit manager 220 culls and/or otherwise limits tuning and viewing data to fit previously established categories (block 802). As described above, in the event a market researcher has an interest for a male age 50, industry standard panelist data acquisition techniques may not exactly fit the desired demographic category. Instead, the industry standard available data may be categorized in terms of males between an age range of 45-54. Because the desired category of interest is for a male age 50, the example category fit manager 220 identifies the closest relevant category grouping that will satisfy the market researcher, which in this example, includes the group of men between the ages of 45-54. The example minutes aggregator 222 identifies a total number of household tuning minutes from the selected category (block 804) and identifies a total number of exposure minutes from the selected category (block 806). In other words, of all the households that match the categories of men age 45-54, the total number of household tuning minutes and exposure minutes are identified.

The example probability generator 224 of FIG. 2 calculates a probability for imputation based on the aforementioned totals (block 808). As described above, the probability of imputation may be calculated by the example probability generator 224 in a manner consistent with example Equation (4). The example probability generator 224 invokes a random number generator to generate a random or pseudo-random number (block 810) and, if the resulting random or pseudo-random number is less than or equal to the probability value (block 812), a household member within a household having a SM 108 is assigned as a viewer of the tuning segment (block 814). On the other hand, in the event the resulting random or pseudo-random number is not less than or equal to the probability value, then the household member within the household having the SM 108 is not assigned as a viewer of the tuning segment (block 816).

Returning to block 704 of FIG. 7, and continuing with the assumption that the threshold number of households to match all of the categories of interest is thirty (30), and the pool of data fails to include that threshold number of qualifying households (block 704), then the example independent distribution engine 218 is invoked by the probability engine 212 to calculate a probability value via an independent distribution technique (block 710).

Figure 9:
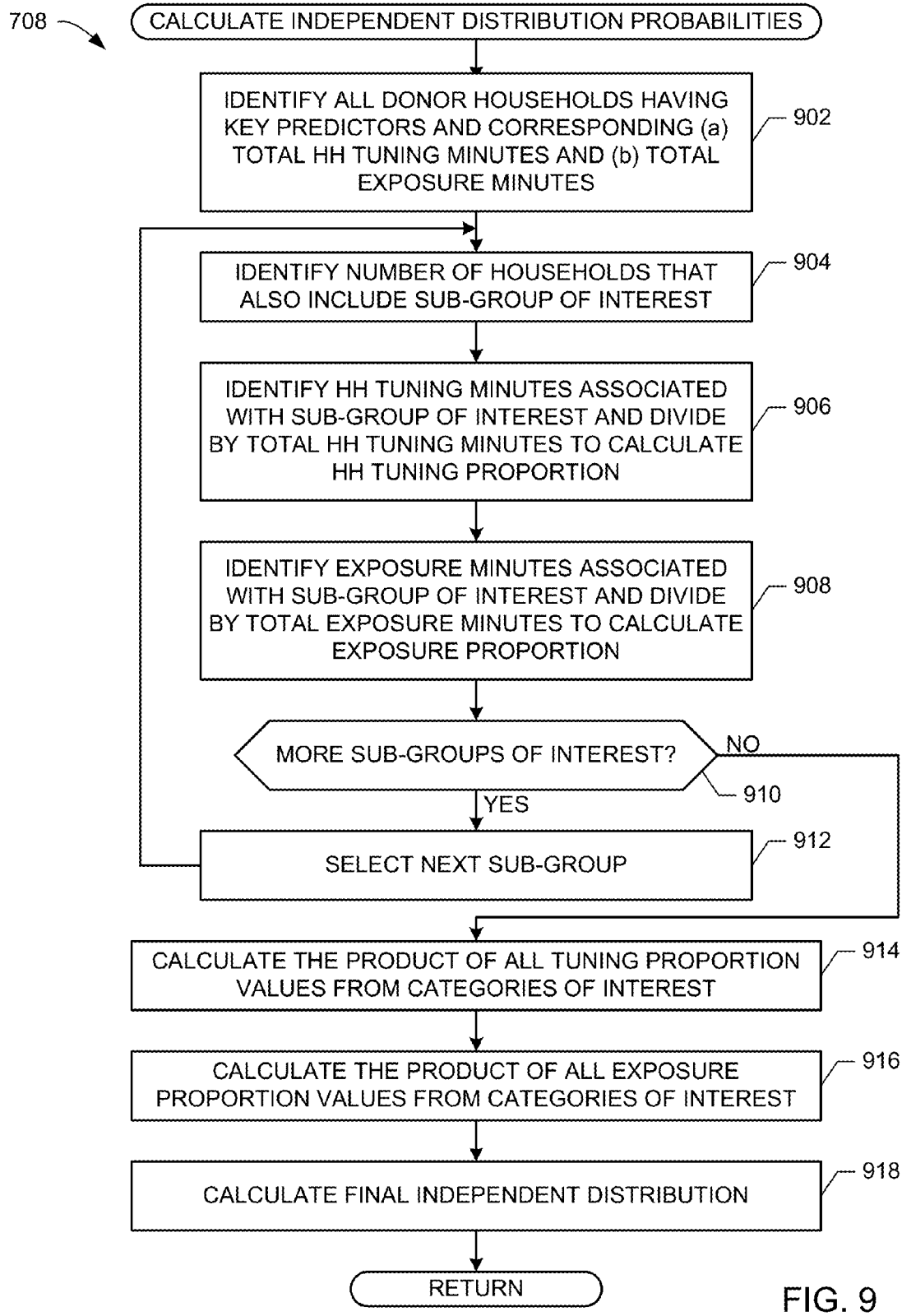

FIG. 9 illustrates an example implementation of the independent distribution probability calculation (block 708) of FIG. 7. In the illustrated example of FIG. 9, the category qualifier 226 identifies all panelist households (e.g., LPM, NPM, etc.) within the donor pool that have the same set of key predictors (block 902). Additionally, the example category qualifier 226 identifies a corresponding number of total tuning minutes associated with the key predictors, and a corresponding number of total household exposure minutes associated with the key predictors. As described above, key predictors may refer to a particular combination of a household size, a gender of interest within the household, and/or an age of interest within the household. For example, the category qualifier 226 may identify all households within the donor pool that have two or more household members, in which one of them is a male age 45-54. For illustration purposes, assume the example category qualifier identified two-hundred (200) households that have two or more members therein, in which one of them is a male age 45-54. Also assume that the combined number of identified households (200) reflect 4500 total household tuning minutes and 3600 total exposure minutes.

In addition to key predictors having an influence on the probability of viewing, one or more additional secondary predictors may also influence the probability of viewing. As described above, the market researcher may have a combined set or target combination of categories of interest, but a number of households having all of those combined set of categories of interest does not exceed a threshold value (e.g., thirty (30) households). However, while the combined set of categories of interest may not be represented en masse from the donor pool, sub portions of the combined set or target combination of categories may include a relatively large representation within the donor pool. Example methods, apparatus, systems and/or articles of manufacture disclosed herein identify independent sub portions (subgroups) of the combined set of categories of interest and corresponding households associated with each subgroup of interest, which are applied independently to calculate a household exposure probability.

The example proportion manager 228 identifies a number of households from the key predictors group (e.g., 200 households having a size 2+ and a male age 45-54) that match a subgroup of interest (block 904). From the subgroup of interest, the example proportion manager 228 identifies a number of household tuning minutes and divides that value by the total household tuning minutes to calculate a household tuning proportion associated with the subgroup of interest (block 906). For example, if the subgroup of interest is all households tuned to the same live station (e.g., WAAA) (e.g., the live tuned station category) and such households reflect 1800 tuning minutes, then the example proportion manager 228 divides 1800 by the total household tuning minutes of 4500 to calculate a tuned station category household tuning proportion of 0.40 (block 906). The example proportion manager 228 also identifies a number of exposure minutes and divides that value by the total exposure minutes to calculate an exposure proportion associated with the subgroup of interest (e.g., the example tuned station category) (block 908). For example, if the subgroup of interest is all households tuned to the same live station (e.g., WAAA) (e.g., the household live tuned station dimension) and such households reflect 1320 exposure minutes, then the example proportion manager 228 divides 1320 by the total exposure minutes of 3600 to calculate a tuned station category exposure proportion of 0.37 (block 908). If more subgroups of interest from the donor pool are available (block 910), then the example proportion manager 228 selects the next subgroup of interest (block 912) and control returns to block 904.

After category household tuning proportion values and exposure proportion values have been calculated for each subgroup of interest, the example distribution engine 230 calculates the product of all household tuning proportion values and the total household tuning minutes (e.g., 4500 in this example) from the categories of interest (block 914), and calculates the product of all exposure proportion values and the total exposure minutes (e.g., 3600 in this example) from the categories of interest (block 916). A final independent distribution probability may then be calculated as the ratio of the exposure minutes and the household tuning minutes in a manner consistent with example Equation (5) (block 918). For example, and as described above in connection with FIG. 5, the resulting ratio of expected exposure minutes (17.47) and expected household tuning minutes (33.65) may be a value of 0.52. This resulting ratio indicates a 52% likelihood that the panelist member is a male age 45-54 that lives in a three person household, classified as an older family, with the head of household education of 9 years to high school graduate, with two television sets in the household, and watching station WAAA live (i.e., not time-shifted) on Mondays through Fridays between 9:00 AM to 12:00 PM.

Figure 10:
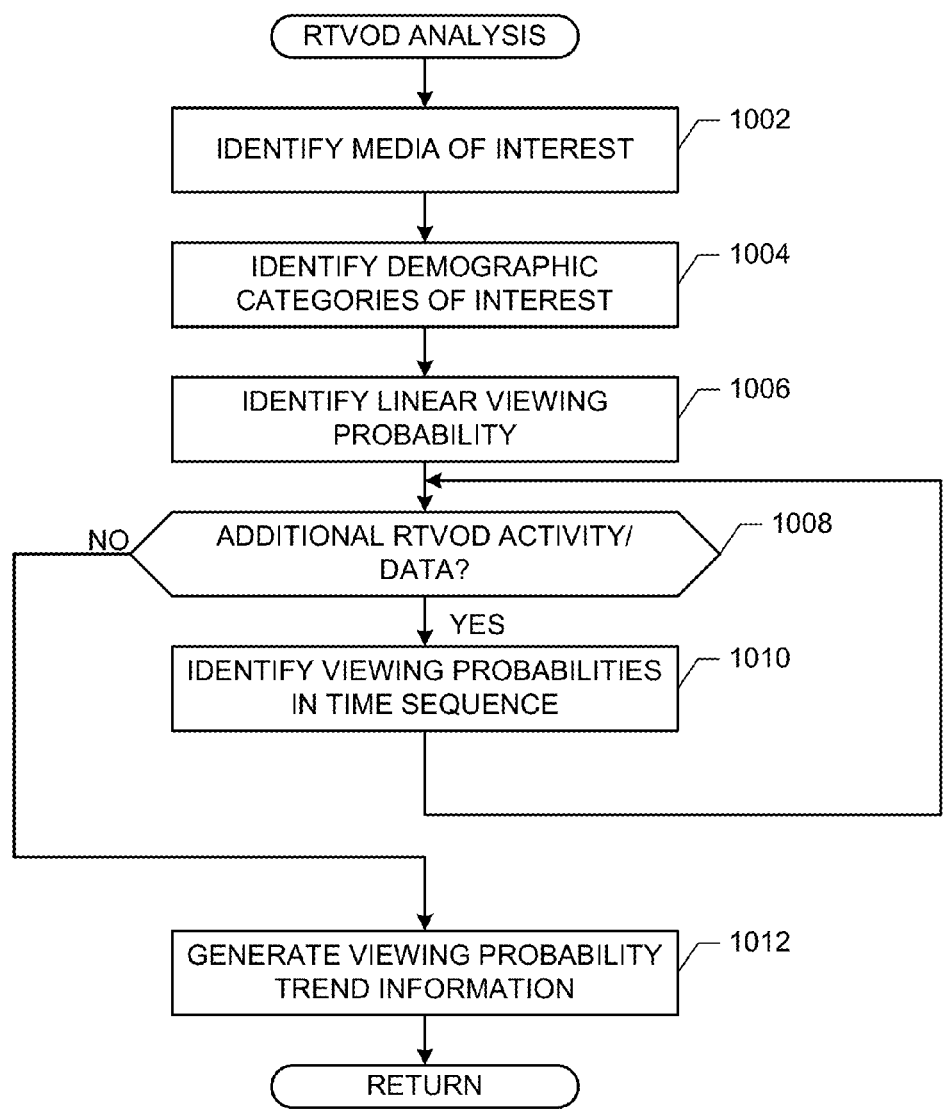

FIG. 10 illustrates an example implementation of the RTVOD analysis (block 612) of FIG. 6. In the illustrated example of FIG. 10, the imputation engine 110 identifies media of interest for which a market researcher may desire viewing probability information (block 1002). As described above, media of interest may include a sitcom, a movie, an advertisement, etc. In some examples, the media of interest includes a corresponding code and/or is associated with a particular signature (e.g., an audio signature) to allow identification of the media of interest. Generally speaking, the media of interest may have a particular viewing probability depending on, in part, a particular demographic audience configuration and whether the media of interest was viewed live (linear viewing) during a regularly scheduled date/time, or whether the media of interest was viewed after a particular delay.

The example category manager 214 identifies demographic categories of interest (block 1004) for which viewing probability information is desired. While the illustrated example of FIG. 10 identifies one particular combination of demographic categories of interest so that a viewing probability effect can be identified as a function of RTVOD telecast delay, examples disclosed herein are not limited thereto. For example, the RTVOD analysis 612 of FIG. 10 may be iterated to identify corresponding trends of viewing probability for any number of different demographic combinations of interest. The example probability engine 212 identifies a linear viewing probability associated with the media of interest and the demographic categories of interest (block 1006) to serve as a baseline when analyzing trends that may be associated with RTVOD telecast delay analysis.

In the event additional RTVOD activity is available (block 1008) (e.g., after determining cell probabilities (block 706 of FIGS. 7 and 8) and/or after determining independent distribution probabilities (block 708 of FIGS. 7 and 9)), then the example probability engine 212 identifies available viewing probabilities in a subsequent temporal sequence from the linear viewing probability (block 1010). For example, the probability engine 212 identifies an available viewing probability associated with an instance of RTVOD telecast delay of one day. The example program 612 returns to block 1008, where the example probability engine 212 identifies whether additional RTVOD telecast delay values have occurred, such as an instance of RTVOD telecast delay of two days. If so, the example probability engine 212 identifies a corresponding viewing probability associated with the telecast delay of two days.

In the event that all values and/or variations of RTVOD telecast delay associated with the selected media of interest and the selected demographic categories of interest have been considered (block 1008), then the example imputation engine 110 generates viewing probability trend information (block 1012).

Figure 11:
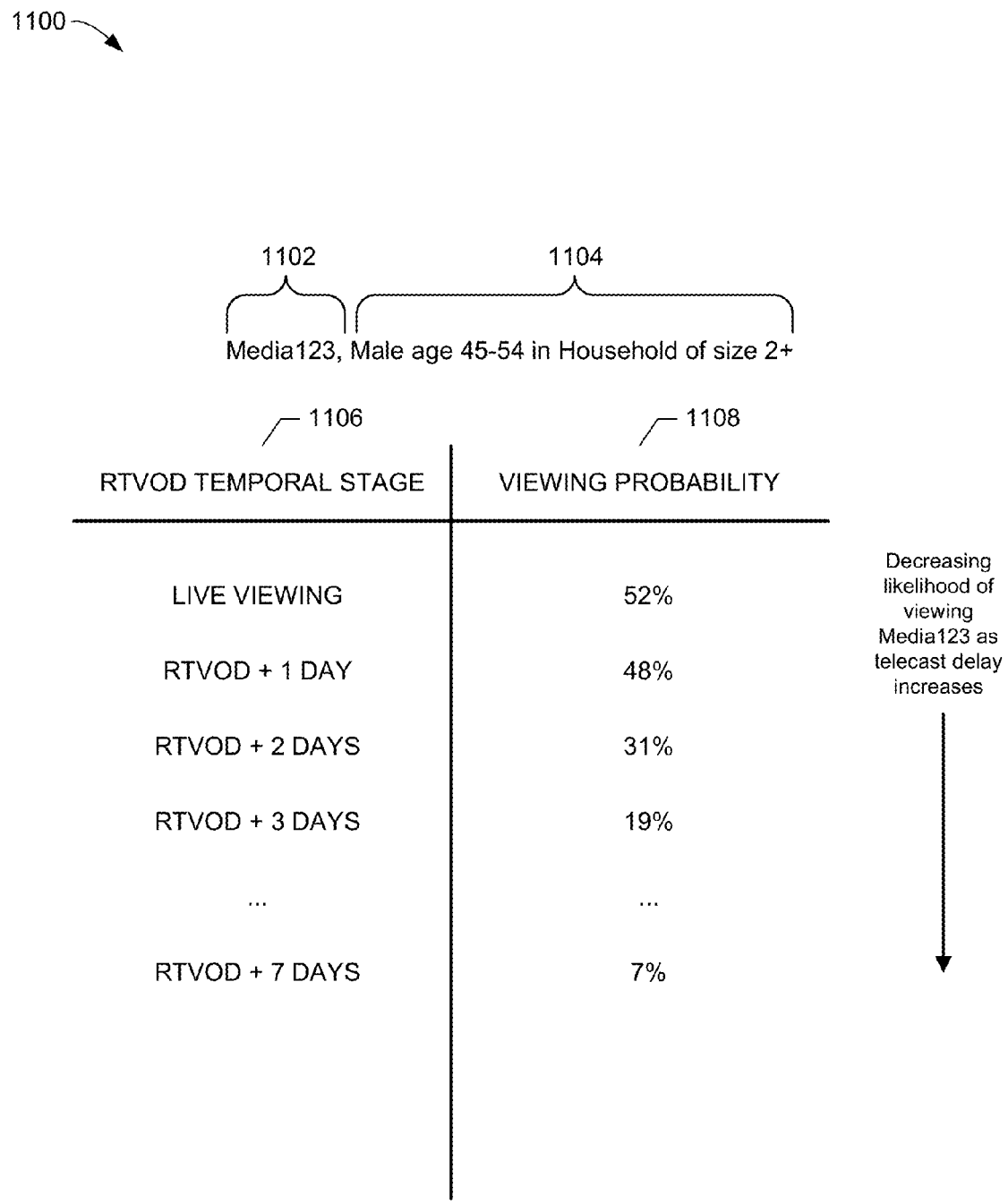
FIG. 11 is an example table of viewing probability values as a function of telecast delay.

FIG. 11 illustrates an example table 1100 generated by the imputation engine 110 having viewing probability values as a function of differing telecast delay values. In the illustrated example of FIG. 11, the table 1100 identifies that the viewing probability information is associated with corresponding media of interest 1102. For the sake of example, the media of interest 1102 is labeled as "Media 123," which could be indicative of a particular sitcom, a particular movie, a particular advertisement, etc. Additionally, the example table 1100 identifies corresponding demographics of interest 1104, which is shown in the illustrated example of FIG. 11 as "Male age 45-54 in a Household of size 2+."

The example table 1100 of FIG. 11 includes an RTVOD stage column 1106 and a viewing probability column 1108. Example RTVOD stage values are indicative of different telecast delay values that may range from immediate (e.g., live or non-time-shifted viewing) 1110, to any number of seconds, minutes, hours, days or weeks beyond an initial linear viewing event (e.g., a date/time when the media of interest was initially available to audiences for viewing). As shown in the illustrated example of FIG. 11, the highest relative viewing probability of "Media 123" for males age 45-54 living in households of size 2+ is 52%, which occurs during live viewing. However, the example probability engine 212 identifies a decreasing trend of viewing probabilities as the telecast delay value increases. Such trending information may reveal one or more marketing opportunities and/or advertising campaign adjustment opportunities for market researchers.

Figure 12:
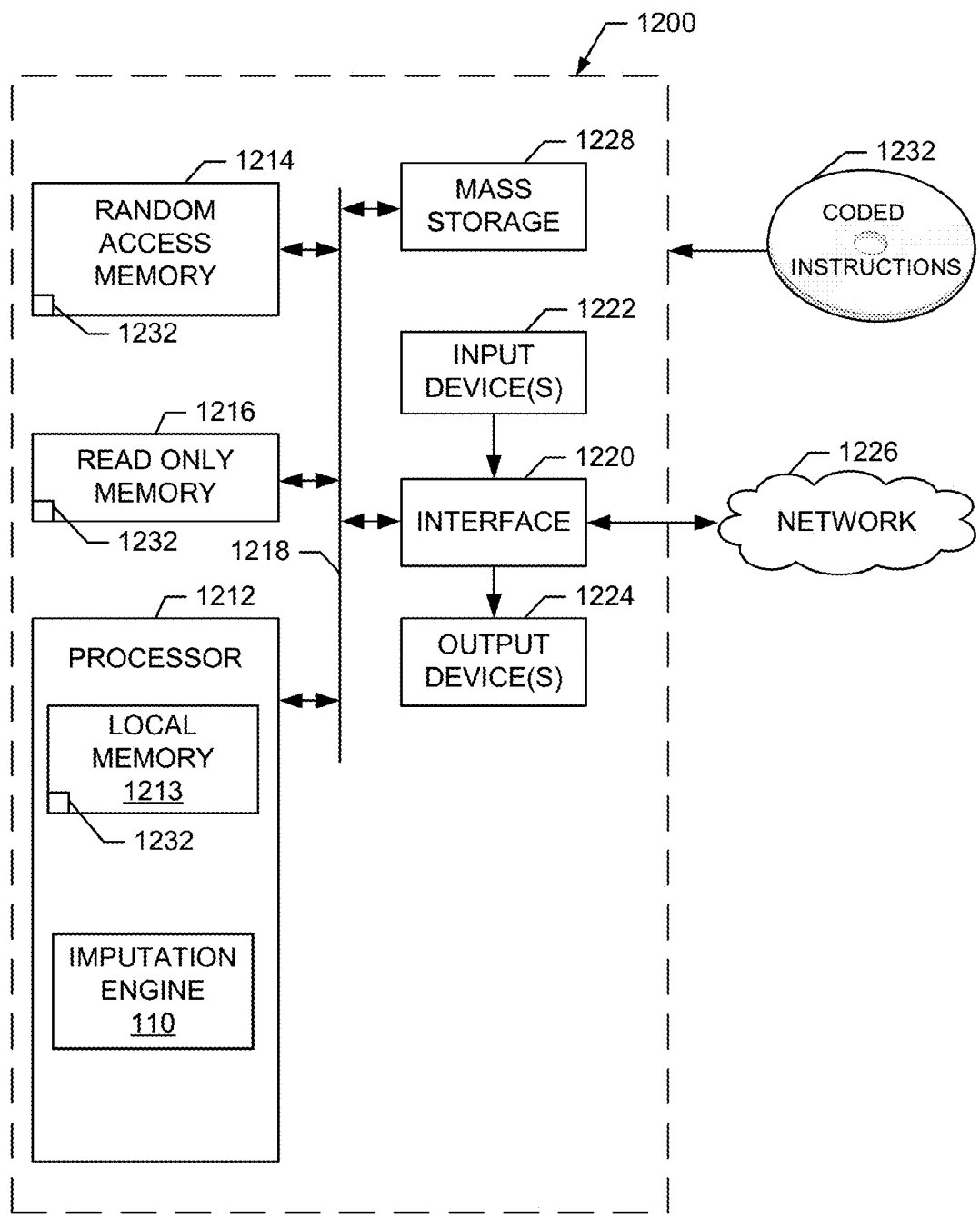
FIG. 12 is a schematic illustration of an example processor platform that may execute the instructions of FIGS. 6-10 to implement the example imputation engine of FIGS. 1 and 2.

FIG. 12 is a block diagram of an example processor platform 1200 capable of executing the instructions of FIGS. 6-10 to implement the imputation engine 110 of FIGS. 1 and 2. The processor platform 1200 can be, for example, a server, a personal computer, an Internet appliance, a digital video recorder, a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 6-10 may be stored in the mass storage device 1228, in the volatile memory 1214, in the non-volatile memory 1216, and/or on a removable tangible computer readable storage medium such as a CD or DVD.

From the foregoing, it will appreciated that the above disclosed methods, apparatus and articles of manufacture allow audience measurement techniques to occur with a substantially larger quantity of households, by employing set meter devices instead of relatively more expensive people meter devices. Examples disclosed herein permit a determination of behavior probability that can be applied to households that do not have a People Meter device and, instead, employ the SM that captures codes, signatures and/or tuning behavior data. Such examples allow behavior probability calculations based on utilization of other households that include the People Meter device, in which the calculations reveal behavior probabilities in a stochastic manner that adheres to expectations of statistical significance. Further, by identifying viewing probabilities based on a type of RTVOD viewing behavior, advertising waste may be reduced (e.g., minimized) so that marketing may be targeted to demographic characteristics related to audiences that are most likely to be consuming media.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computer-implemented method to reduce waste of a first advertising targeting strategy for a first media, the method comprising:

identifying, by executing an instruction with a processor, a first set of households associated with a target set of categories associated with the first advertising targeting strategy, the first media presented in the first set of households with a first time shift delay;

calculating, by executing an instruction with the processor, a first viewing probability associated with the first time shift delay based on a ratio of (a) exposure minutes of the first media in the first set of households, and (b) tuning minutes of the first media in the first set of households;

identifying, by executing an instruction with the processor, a second set of households associated with the target set of categories associated with the first advertising targeting strategy, the first media presented in the second set of households with a second time shift delay; and reducing, by executing an instruction with the processor, waste of the first advertising targeting strategy of the first media associated with the second time shift delay by selecting a second advertising targeting strategy for the first media in response to determining that the second time shift delay of the first media has a second viewing probability that is less than the first viewing probability, the determination being based on a ratio of (a) exposure minutes of the first media in the second set of households, and (b) tuning minutes of the first media in the second set of households.

2. The method as defined in claim 1, further including generating a list of viewing probabilities of the first media associated with subsequent time shift delay values from the first time shift delay.

3. The method as defined in claim 2, further including identifying viewing probability trend information for the first advertising strategy based on the list of viewing probabilities.

4. The method as defined in claim 1, wherein the first time shift delay is associated with live viewing.

5. The method as defined in claim 1, wherein the first advertising targeting strategy includes targeting a first demographic of interest.

6. The method as defined in claim 1, wherein the second advertising targeting strategy includes a second demographic of interest.

7. The method as defined in claim 6, wherein the second demographic of interest is different from the first demographic of interest and includes an alternate viewing probability that is greater than the second viewing probability.

8. The method as defined in claim 1, wherein the first time shift delay includes a telecast delay.

9. An apparatus to reduce waste of a first advertising targeting strategy for a first media, the apparatus comprising:
a category manager to:
identify a first set of households associated with a target set of categories associated with the first advertising targeting strategy, the first media presented in the first set of households with a first time shift delay; and
identify a second set of households associated with the target set of categories associated with the first advertising targeting strategy, the first media presented in the second set of households with a second time shift delay;
a probability engine to:
calculate a first viewing probability associated with the first time shift delay based on a ratio of (a) exposure minutes of the first media in the first set of households, and (b) tuning minutes of the first media in the first set of households; and reduce waste of the first advertising targeting strategy of the first media associated with the second time shift delay by selecting a second advertising targeting strategy for the first media in response to determining that the second time shift delay of the first media has a second viewing probability that is less than the first viewing probability, the determination being based on a ratio of (a) exposure minutes of the first media in the second set of households, and (b) tuning minutes of the first media in the second set of households.

10. The apparatus as defined in claim 9, wherein the category manager is to generate a list of viewing probabilities of the first media associated with subsequent time shift delay values from the first time shift delay.

11. The apparatus as defined in claim 10, wherein the category manager is to identify viewing probability trend information for the first advertising strategy based on the list of viewing probabilities.

12. The apparatus as defined in claim 9, wherein the first time shift delay is associated with live viewing.

13. The apparatus as defined in claim 9, wherein the probability engine is to target a first demographic of interest with the first advertising targeting strategy.

14. The apparatus as defined in claim 9, wherein the probability engine is to target a second demographic of interest with the second advertising targeting strategy.

15. A tangible computer-readable storage medium comprising instructions that, when executed, cause a processor to, at least:
identify a first set of households associated with a target set of categories associated with a first advertising targeting strategy, a first media presented in the first set of households with a first time shift delay;
calculate a first viewing probability associated with the first time shift delay based on a ratio of (a) exposure minutes of the first media in the first set of households, and (b) tuning minutes of the first media in the first set of households;
identify a second set of households associated with the target set of categories associated with the first advertising targeting strategy, the first media presented in the second set of households with a second time shift delay; and
reduce waste of the first advertising targeting strategy of the first media associated with the second time shift delay by selecting a second advertising targeting strategy for the first media in response to determining that the second time shift delay of the first media has a second viewing probability that is less than the first viewing probability, the determination being based on a ratio of (a) exposure minutes of the first media in the second set of households, and (b) tuning minutes of the first media in the second set of households.

16. The computer-readable instructions as defined in claim 15 that, when executed, cause the processor to generate a list of viewing probabilities of the first media associated with subsequent time shift delay values from the first time shift delay.

17. The computer-readable instructions as defined in claim 16 that, when executed, cause the processor to identify viewing probability trend information for the first advertising strategy based on the list of viewing probabilities.

18. The computer-readable instructions as defined in claim 15 that, when executed, cause the processor to associate the first time shift delay with live viewing activity.

19. The computer-readable instructions as defined in claim 15 that, when executed, cause the processor to target a second demographic of interest during the second advertising targeting strategy.

20. The computer-readable instructions as defined in claim 19 that, when executed, cause the processor to identify that the second demographic of interest is different from the first demographic of interest and includes an alternate viewing probability that is greater than the second viewing probability.

* * * * *